(12) United States Patent
Winningham et al.

(10) Patent No.: US 6,656,568 B1
(45) Date of Patent: Dec. 2, 2003

(54) ORDERED ARRAYS OF NANOCLUSTERS

(75) Inventors: Thomas Andrew Winningham, Broomfield, CO (US); Harry P. Gillis, Los Angeles, CA (US); Kenneth Douglas, Boulder, CO (US)

(73) Assignee: The Regents of the University of Colorado, Boulder, CO (US)

( * ) Notice: Subject to any disclaimer, the term of this patent is extended or adjusted under 35 U.S.C. 154(b) by 247 days.

(21) Appl. No.: 09/583,209

(22) Filed: May 30, 2000

Related U.S. Application Data

(60) Provisional application No. 60/136,412, filed on May 28, 1999.

(51) Int. Cl.[7] .................................................. G03F 9/00
(52) U.S. Cl. ........................ 428/145; 428/141; 428/195; 428/220; 428/332
(58) Field of Search ................................ 428/141, 145, 428/195, 220, 332

(56) References Cited

U.S. PATENT DOCUMENTS

| | | |
|---|---|---|
| 4,728,591 A | 3/1988 | Clark et al. |
| 4,802,951 A | 2/1989 | Clark et al. |
| 5,229,320 A | 7/1993 | Ugajin |
| 5,559,822 A | 9/1996 | Pankove et al. |
| 5,683,595 A | 11/1997 | Nagamachi |
| 5,689,603 A * | 11/1997 | Huth ............................ 385/131 |
| 5,703,896 A | 12/1997 | Pankove et al. |
| 5,747,180 A | 5/1998 | Miller et al. |
| 5,858,457 A | 1/1999 | Brinker et al. |
| 5,882,538 A | 3/1999 | Martin et al. |
| 5,899,734 A | 5/1999 | Lee |
| 5,917,285 A | 6/1999 | Gillis et al. |
| 5,962,863 A * | 10/1999 | Russell et al. ................. 257/14 |
| 6,027,663 A | 2/2000 | Martin et al. |
| 6,033,587 A | 3/2000 | Martin et al. |

OTHER PUBLICATIONS

Arkles, Barry, "Silane Coupling Agent Chemistry," in Silicon Compounds: Register and Review, 5th Ed., United Chemical Technologies, Inc., Bristol, PA, pp. 59–64, No Date.

Baumeister, W. et al., "The Structure of Surface Proteins in Sulfolobus, in *Crystalline Bacterial Cell Surface Layers*," Sleytr, U.B. et al., eds., Springer–Verlag, Berlin, 1988, pp. 75–78, No Month.

Bhatia, Suresh K. et al., "Fabrication of Surfaces Resistant to Protein Adsorption and Application to Two–Dimensional Protein Patterning," *Analytical Biochemistry*, vol. 208, 1993, pp. 197–205, No Month.

Brock, Thomas D. et al., "Sulfobus: A New Genus of Sulfur–Oxidizing Bacteria Living at Low pH and High Temperature," *Arch. Mikrobiol.* 84, Springer–Verlag, 1972, pp. 54–68, No Month.

Deatherage, J.F. et al., "Three–dimensional Arrangement of the Cell Wall Protein of *Sulfolobus acidocaldarius*," *J. Mol. Biol.*, vol. 167, pp. 823–852, No month.

(List continued on next page.)

*Primary Examiner*—Deborah Jones
*Assistant Examiner*—Stephen Stein
(74) *Attorney, Agent, or Firm*—Marian J. Furst

(57) ABSTRACT

A method of manufacturing an array of nanoclusters and a substrate with an ordered array of nanoclusters. In a preferred embodiment of the invention, nanoclusters may be fabricated by depositing adatoms upon a surface containing an array of etched nanoscale wells, wherein the etched nanoscale wells are produced by etching a surface patterned by a mask containing a regular array of nanoscale pores. More preferably, nanoclusters may be fabricated by depositing adatoms upon a surface containing an array of etched nanoscale wells; wherein, the etched nanoscale wells are produced by low damage etching of a surface patterned by a crystalline mask of biological origin containing a regular array of nanoscale pores. A still further embodiment of the invention is a substrate including an ordered array of nanoclusters.

7 Claims, 10 Drawing Sheets-

OTHER PUBLICATIONS

Douglas, Kenneth et al., "Nanometer Molecular Lithography," *Appl. Phys. Lett.*, vol. 48, No. 10, Mar. 10, 1986, pp. 676–678; correction in *Appl. Phys. Lett.*, vol. 48, No. 26, Jun. 30, 1986, p. 1812.

Douglas, Kenneth et al., "Transfer of Biologically Derived Nanometer–Scale Patterns to Smooth Substrates," *Science*, vol. 257, Jul. 31, 1992, pp. 642–644.

Gérard, Jean–Michel et al., "Prospects of High–Efficiency Quantum Boxes Obtained by Direct Epitaxial Growth," in Confined Electrons and Photons: *New Physics and Applications*, Elias Burstein and Claude Weisbuch, eds., Plenum Press, New York, 1995, pp. 357–381, No Month.

Gillis, H.P. et al., "Low–energy electron beam enhanced etching of Si(100)–(2×1) by molecular hydrogen," *J. Vac. Sci. Technol B*, vol. 10, No. 6, Nov./Dec. 1992, pp. 2729–2733.

Gillis, H.P. et al., "Low energy electron–enhanced etching of Si(100) in hydrogen/helium direct–current plasma," *Appl. Phys. Lett.*, vol. 66, No. 19, May 8, 1995, pp. 2475–2477.

Grogan, Dennis W., "Phenotypic Characterization of the Archaebacterial Genus Sulfolobus: Comparison of Five Wild–Type Strains," *J. Bacteriology*, vol. 171, No. 12, Dec. 1989, pp. 6710–6719.

Grundman, M. et al., "Ultranarrow Luminescence Lines from Single Quantum Dots," *Phys. Rev. Lett.*, vol. 74, No. 20, May 15, 1995, pp. 4043–4046.

Harrison, Christopher et al., "Lithography with a mask of block copolymer microstructures," *J. Vac. Sci. Technol. B*, vol. 16, No. 2, Mar./Apr. 1968, pp. 544–552.

Heath, J.R. et al., "Spatially Confined Chemistry: Fabrication of Ge Quantum Dot Arrays," *J. Phys. Chem.*, vol. 100, 1996, pp. 3144–3149, No Month.

Heath, James R. et al., "Pressure/Temperature Phase Diagrams and Superlattices of Organically Functionalized Metal Nanocrystal Monolayers: The Influence of Particle Size, Size Distribution, and Surface Passivatn," *J. Phys. Chem. B*, vol. 101, 1997, pp. 189–197, No month.

Hulteen, John C. et al., "Nanosphere lithography: A materials general fabrication process for periodic particle array surfaces," *J. Vac. Sci. Technol. A*, vol. 13, No. 3, May–Jun. 1995, pp. 1553–1558.

Jackman, Rebecca J. et al., "Fabrication of Submicrometer Features on Curved Substrates by Microcontact Printing," *Science*, vol. 279, Aug. 4, 1995, pp. 664–666.

Kim, Enoch et al., "Combining Patterned Self–Assembled Monolayers of Alkanethiols on Gold with Anisotropic Etching of Silicon to Generate Controlled Surface Morphologies," *J. Electrochem. Soc.*, vol. 142, No. 2, Feb. 1995, pp. 628–632.

Kirstaedter, N. et al., "Gain and differential gain of single layer InAs/GaAs quantum dot injection lasers," *Appl. Phys. Lett.*, vol. 69, No. 9, Aug. 26, 1996, pp. 1226–1228.

Kumar et al., "Features of gold having micrometer to centimeter dimensions can be formed through a combination of stamping with an elastomeric stammp and an alkanethiol "ink" followed by chemical etching," *Appl. Phys. Lett.*, vol. 63, No. 14, Oct. 4, 1993, pp. 2002–2004.

Kumar, Amit et al., "Patterning Self–Assembled Monolayers: Applications in Materials Science," *Langmuir*, vol. 10, 1994, pp. 1498–1511, No Month.

Lembcke, G. et al., "Image analysis and processing of an imperfect two–dimensional crystal: the surface layer of the archaedbacterium *Sulfolobus acidocaldarius* re–investigated," *J. Microscopy*, vol. 161, Pt. 2, Feb. 1991, pp. 263–278.

Lercel, M.J. et al., "Sub–10 nm lithography with self–assembled monolayers," *Appl. Phys. Lett.*, vol. 68, No. 11, Mar. 11, 1986, pp. 1504–1506.

F. Llewellyn–Jones, The Glow Discharge, John Wiley & Sons, New York, 1966, p. 66, No Month.

Luedtke, W.D. et al., "Structure, Dynamics, and Thermodynamics of Passivated Gold Nanocrystallites and Their Assemblies," *J. Phys. Chem.*, vol. 100, No. 32, Aug. 8, 1996, pp. 13323–13329.

Michel, H., et al., "The 2–D Crystalline Cell Wall of *Sulfolobus Acidocaldarius*: Structure, Solubilization, and Reassembly," in Electron Microscopy at Molecular Dimensions: State of the Art and Strategies for the Future, Wolfgang Baumeister and Wolrad Vogell, eds, Springer–Verlag, Berlin, 1980, pp. 27–35, No Month.

Moore, Jon T. et al., "Controlled morphology of biologically derived metal nanopatterns," *Appl. Phys. Lett.*, vol. 71, No. 9, Sep. 1, 1997, pp. 1264–1266.

Murray, C.B. et al., "Synthesis and Characterization of Nearly Monodisperse CdE (E=S, Se, Te) Semiconductor Nanocrystallites," *J. Am. Chem. Soc.*, vol. 115, 1993, pp. 8706–8715, No month.

Murray, C.B. et al., "Self–Organization of CdSe Nanocrystallites into Three–Dimensional Quantum Dot Superlattices," *Science*, vol. 270, Nov. 24, 1995, pp. 1335–1338.

Ohara, Pamela C. et al., "Crystallization of Opals from Polydisperse Nanoparticles," *Phys. Rev. Lett.*, vol. 75, No. 19, Nov. 6, 1995, pp. 3466–3469.

Ozin, Geoffrey A, Morphogenesif of Biomineral and Morphosynthesis of Biomimetic Forms, *Acc. Chem. Res.*, vol. 30, 1997, pp. 17–27, No Month.

Pearson, D.H. et al., "Nanochannel Glass Replica Membranes," *Science*, vol. 270, Oct. 6, 1995, pp. 68–70.

Pum, Dietmar et al., "Anisotropic crystal growth of the S–layer of *Bacillus sphaericus* CCM 2177 at the air/water interface," *Colloids and Surfaces A: Physiochemical and Engineering Aspects*, vol. 102, 1995, pp. 99–104, No Month.

Pum, Dietmar et al., "Molecular Nanotechnology and Biomimetics with S–layers," in Uwe B.Sleytr et al., eds., Crystalline Bacterial Cell Surface Proteins, Academic Press, 1996, pp. 175–209, No Month.

Sleytr, Uwe B. et al., "Crystalline Surface Layers on Bacteria," *Ann. Rev. Microbiol.*, vol. 37, 1983, pp. 311–339, No Month.

Sleytr, Uwe B. et al., "Two–Dimensional Protein Crystals (S–Layers): Fundamentals and Application Potential," *Mat. Res. Soc. Symp. Proc.*, vol. 330, 1994, pp. 193–199, No Month.

St. John, Pamela M. et al., "Microcontact printing and pattern transfer using trichlorosilanes on oxide substrates," *Appl. Phys. Lett.*, vol. 68, No. 7, Feb. 12, 1996, pp. 1022–1024.

Steiner, Pinckney Alston IV, Anisotropic Low–energy Electron–Enhanced Etching of Semiconductors in DC Plasma, Thesis submitted to Georgia Institute of Technology, Jun., 1993.

Taylor, K.A. et al., "Structure of the S–layer of *Sulfolobus acidocaldarius*," *Nature*, vol. 299, Oct. 28, 1982, pp. 840–842.

Van der Gaag, B.P. et al., "Microfabrication below 10 nm," *Appl. Phys. Lett.*, vol. 56, No. 5, Jan. 29, 1990, pp. 481–483.

Weiss, Richard L., "Subunit Cell Wall of *Sulfolobys acidocaldarius*," *J. Bacteriology*, Apr. 1974, pp. 275–284.

Whetten, Robert L. et al., "Nanocrystal Gold Molecules," *Adv. Mater.*, vol. 8, No. 5, 1996, pp. 428–433, No Month.

Wilbur, James L. et al., "Microfabrication by Microcontact Printing of Self–Assembled Monolayers," *Adv. Mater.*, vol. 6, No. 7/8, 1994, pp. 600–604, No Month.

\* cited by examiner

Condensation

Hydrogen bonding

ORDERED ARRAYS OF NANOCLUSTERS

This application is a continuation-in-part of copending application Ser. No. 60/136,412 filed May 28, 1999 which is incorporated herein by reference, in its entirety.

The U.S. government has a paid-up license in this invention and the right in limited circumstances to require the patent owner to license to others on reasonable terms as provided for by the terms of contracts F49620-96-1-0007 and F49620-99-0105 awarded by the Air Force Office of Scientific Research.

BACKGROUND OF THE INVENTION

1. Field of the Invention

The present invention relates generally to a method for manufacturing an array of nanoclusters and a substrate with an ordered array of nanoclusters. More particularly, the method deposits atoms upon a surface containing an ordered array of nanoscale holes that have been produced by etching a surface patterned by a mask containing a regular array of nanoscale pores.

2. Description of Related Art

The ability to control function by controlling size makes nanoclusters very attractive for technological applications in high-speed computing, high density data storage and display, and optical communications through devices such as the single-electron transistor and the quantum dot laser. Designs for such devices require not only sharp control of nanocluster size, but also fabrication of ordered arrays of nanoclusters and, in some cases, interconnections between clusters within the array.

As has been discussed elsewhere (for example, J.-M. Gerard 1995), single layer quantum dot arrays have been demonstrated to have excellent optical properties such as high quantum efficiency, long radiative lifetimes, and very fast PL rise times. However, direct growth has been stymied by "the prerequisite of an ultrafine lithographic definition of the mask."

Dramatic advances have been made recently in obtaining ordered arrays of nanoclusters from liquid phase syntheses by selective precipitation and Langmuir-Blodgett techniques Murray et al. (1993) Ohara et al. (1995) Murray et al. 1995, Whetten et al. 1996; Luedtke et al. (1996); Heath et al. 1997. Ordered arrays have also been produced using films of close-packed polystyrene spheres as deposition masks [Hulteen et al. (1995).] Ensembles of individual, size-controlled InP quantum dots grown by self-assembly in molecular beam epitaxy on a GaAs surface have emitted light of very narrow bandwidth at a wavelength determined by the size of the dots [Grundmann et al. (1995)]; embedded between electron-injecting and hole-injecting layers, these dots have exhibited lasing [Kirstaedter (1996)]. However, because they grow at randomly distributed nucleation sites on the substrate, their location is difficult to control.

From the point of view of device fabrication, it is desirable to first define the desired nanoscale array pattern directly on the substrate and then grow or deposit the nanoclusters on the patterned substrate. The nanoclusters produced preferably have diameters less than about 25 nm to show true quantum confinement behavior.

In earlier work, Heath and co-workers [1996] studied the formation of clusters in confined geometries by defining 100 and 150 nm diameter holes in a thin oxide mask over a Si wafer and then growing Ge clusters on the Si surfaces exposed in the etched holes Gills et al. (1992). They observed a few clusters in each 150 nm hole at locations distributed over the bottom of the hole. A few of the 100 nm holes contained a single cluster, but difficulties with that sample precluded complete analysis. Their results showed that the confining geometry of the 150 nm hole limited the number and size of clusters growing in the hole but did not precisely control their location.

What was needed, and what was apparently not available until the presently described invention, is a method of controlling the position as well as the size of a nanocluster. By etching holes an order of magnitude smaller in diameter than those of Heath and co-workers, we observe the formation of a single nanocluster in each hole when Ti adatoms are deposited on a Si substrate that has been etched to define an array of nanometer-sized holes. The symmetry and lattice constant of the array (as determined by atomic force microscopy (AFM)) are identical to those of the etched holes, demonstrating that these extremely small holes control the position as well as the number of clusters grown in each hole.

SUMMARY

It is an object of the present invention to provide new nanopattern mask materials which allow formation of nanoclusters without the slow throughput of electron beam lithography and the high cost of X-ray lithography.

It is another object of the present invention to provide new nanopattern masks which intrinsically contain mesoscopic scale openings.

It is a further object of the present invention to provide a process for creating nanoclusters combining the steps of obtaining a biologically derived mask, transferring the mask pattern to a substrate using low-damage dry etching, and initiating cluster growth by adatom deposition.

It still another object of the present invention to achieve massively parallel processing in fabricating an ordered and precisely positioned array of nanoclusters.

It is yet another object of the present invention to create arrays of holes having diameters small enough to induce the formation of nanoclusters which exhibit quantum confinement behavior without causing adjacent lattice damage to the substrate.

To achieve the foregoing and other objects and in accordance with the purpose of the present invention broadly described herein, one embodiment of this invention comprises a method for fabricating ordered arrays of nanoclusters. The method comprises the steps of using a crystalline mask for low energy electron enhanced etching of nanoscale wells in a substrate, wherein the mask has a crystal structure including an ordered array of nanoscale pores; and depositing additional material to form nanoclusters in the wells. In a preferred embodiment, the mask comprises a protein, more preferably a bacterial S-layer such as an S-layer derived from a member of the genus *Sulfolobus*. The depositing step may comprise forming a single nanocluster in each of substantially all of the wells.

Another embodiment of the present invention comprises a method for preparing crystalline masks for use in fabricating ordered arrays of nanoclusters on a substrate. The method comprises the steps of providing an isolated crystalline material, wherein the crystal structure includes an ordered array of nanoscale pores; and mounting the crystalline material on the substrate to form a mask for depositing material on the substrate or removing material from the substrate based on the locations of the pores. The providing step may comprise culturing an organism which synthesizes a crystalline material, wherein the crystal structure includes an ordered array of nanoscale pores; and isolating the crystalline material. The mounting step may comprise forming a suspension of the crystalline material in a liquid; applying the suspension to a surface of the substrate; and removing the liquid from the surface. One of the forming step and the applying step may additionally comprise adding a surfactant to the suspension to alter the ability of the liquid to wet the surface.

Yet another embodiment of the present invention comprises a method for fabricating ordered arrays of nanoclusters. The method comprises the steps of using a crystalline mask for performing at least one operation on a substrate, wherein the crystalline mask has a crystal structure which includes nanoscale pores, and the operation is selected from depositing material on the substrate and removing material from the substrate based on the locations of the pores. The mask may be of biological origin, such as from bacteria of the genus *Sulfolobus*.

In another embodiment of the present invention, a substrate includes an ordered array of nanoclusters, wherein the nanoclusters have a uniform size small enough to allow true quantum confinement behavior, and the nanoclusters occur in a repeating geometric pattern. Preferably, the nanocluster spacing is between about 3 and about 30 nm. Also preferably, the nanoclusters have a diameter varying from about 2 to about 10 nm. The nanoclusters may be formed inside regularly arrayed wells in the substrate, with substantially no lattice displacement adjacent to the wells. Preferably, substantially all of the wells each contain a single nanocluster. The nanoclusters may comprise a material selected from titanium, germanium, and silicon. Further, the substrate may include a plurality of groups of regularly arrayed wells, with the groups arranged in a predetermined pattern.

BRIEF DESCRIPTION OF THE DRAWINGS

These and other features, aspects, and advantages of the present invention will become better understood with reference to the following description, appended claims, and accompanying drawings, where:

DETAILED DESCRIPTION

Figure 1:
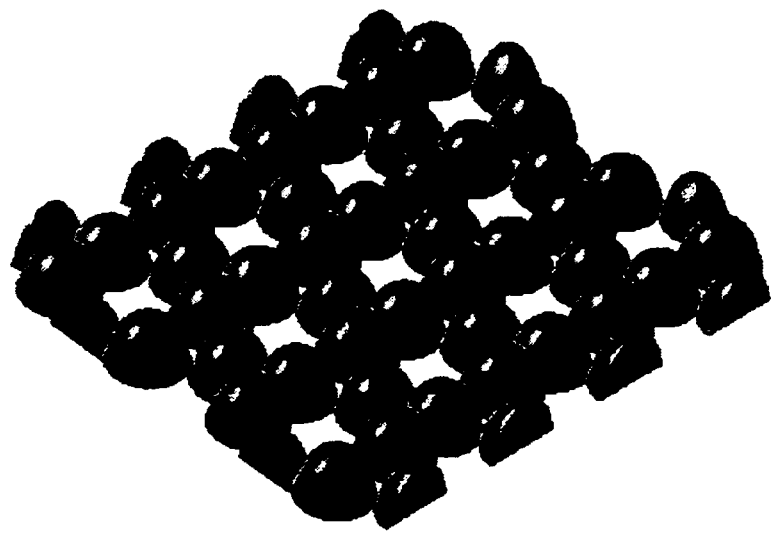
FIG. 1 is a schematic representation of a crystalline S-layer protein.

It should be noted that all references cited in this Description are incorporated herein by reference, in their entirety.

In accordance with the present invention, we have used new methods of nanofabrication to produce ordered arrays of single nanoclusters in the 5 nm size range.

These nanoclusters can be produced via highly scaleable method for the inexpensive, parallel fabrication of dense, ordered arrays of semiconductor quantum dots that can serve in single layers as the emissive elements in active layers of electroluminescent devices, such as flat panel displays, ultrathin displays deployed on flexible substrates, and vertical-cavity surface-emitting lasers (VCSELs). The dots within an array have a highly uniform size and spacing, arising naturally from the inherent order of the nanometer-scale masks employed to create the quantum dots. The formation of the dot arrays can proceed in a very straightforward way using a highly selective dry etching process followed by conventional molecular beam epitaxy. Moreover, the technique does not require a strain field or complex growth kinetics as are often employed in multilayer quantum dot designs for VCSELs.

The combination of process steps, including use of a biologically derived mask, pattern transfer by low damage etching, and quantum dot growth by adatom deposition, has collectively achieved massively parallel processing in fabricating an ordered and precisely positioned array of nanoclusters. Such parallel processing methods, analogous to the optical lithography and wide area etching used routinely today in microfabrication, are highly desirable to ensure the manufacturability of nanostructures and to realize thereby the technological promise offered by devices in the nano regime.

These nanoclusters can be produced via a highly scaleable method for the inexpensive, parallel fabrication of dense, ordered arrays of semiconductor quantum dots that can serve in single layers as the emissive elements in active layers of electroluminescent devices, such as flat panel displays, ultrathin displays deployed on flexible substrates, and vertical-cavity surface-emitting lasers (VCSELs). The dots within an array have a highly uniform size and spacing, arising naturally from the inherent order of the nanometer-scale masks employed to create the quantum dots. The formation of the dot arrays can proceed in a very straightforward way using a highly selective dry etching process followed by conventional molecular beam epitaxy. Moreover, the technique does not require a strain field or complex growth kinetics as are often employed in multilayer quantum dot designs for VCSELs.

The combination of process steps, including use of a biologically derived mask, pattern transfer by LE4 etching, and quantum dot growth by adatom deposition, has collectively achieved massively parallel processing in fabricating an ordered and precisely positioned array of nanoclusters. Such parallel processing methods, analogous to the optical lithography and wide area etching used routinely today in microfabrication, are highly desirable to ensure the manufacturability of nanostructures and to realize thereby the technological promise offered by devices in the nano regime.

In one embodiment, we used LE4 etching [Gillis et al. (1995)] in a DC hydrogen plasma to transfer an hexagonal array of 18 nm diameter holes with a 22 nm lattice constant from a biologically derived mask [Clark et al. (1986); Douglas et al. (1986); Clark et al. (1989); and Douglas et al. (1992)] into Si (100). After etching, the mask was removed, and the patterned surface was intentionally oxidized in an oxygen plasma. Deposition of 1.2 nm of Ti on the oxidized surface produced an ordered array of 5 nm diameter metal nanoclusters positioned at the etched hole sites.

Also in accordance with the present invention, it has been demonstrated that sufficiently small nanometer-scale patterns on a surface can control nucleation and growth of materials deposited on that surface and can produce an ordered array of nanoclusters in which each cluster is precisely located at a position determined a priori. Arrays of wells have been etched, and a single nanocluster has been formed in each of the etched wells by self-organization of deposited adatoms. The symmetry and lattice constant of the array are identical to those of the etched wells, demonstrating that these extremely small wells control the position as well as the number of clusters grown in each well. Further, the etched wells were small enough to reduce the diffusion field of adatoms within the holes so severely that subsequent nucleation was suppressed after the first cluster had formed in each well.

Using a biological protein crystal which already incorporated nanometer-scale features to generate the mask allowed the fabrication of structural features a factor of two smaller than those defined by standard lithographic processes. Further, the slow steps of defining the nanostructures by serial lithography may be avoided.

Moreover, LE4 etching, unlike reactive ion etching (RIE), can etch features smaller than 25 nm without damage to the remaining material in the substrate, allowing control of the surface chemistry of the etched surfaces and, consequently, the morphology of subsequently deposited materials.

In accordance with the present invention, arrays of nanostructures can be prepared by obtaining a mask which includes an array of holes with the desired hole size and spacing. The substrate surface is prepared, and the mask is then deposited on the substrate surface. The mask pattern is then transferred to the substrate using low-damage etching to produce an array of wells in the substrate surface corresponding to the pattern of the mask. The mask is stripped from the substrate surface, and nanoscale structures are formed in the wells.

In accordance with the present invention, any material which comprises a sheet-like structure and incorporates a regular, repeating array of holes can be used as a mask for formation of nanostructures. For example, inorganic molecules having a porous crystal structure could be used. Alternatively, a thin film of diblock copolymers could be created with an array of nanometer-scale holes, as described in Harrison et al. (1998). Another type of mask could be formed by drawing a group of glass capillaries out until the inner diameters are of nanometer-scale dimensions, as described in Pearson et al. (1995). Also, masks can be generated by using other naturally occurring materials similar to those used here [Sleytr et al. (1997)], by modifying naturally occurring masks [Moore et al. (1997)], by using chemical self-assembly [Kim et al. (1995); Jackman et al. (1995)], or by using biomimetic growth methods [Ozin et al. (1997)].

A preferred type of mask is a crystalline material of biological origin. For example, some species of bacteria have a two-dimensional crystalline protein layer which forms the external surface of the membranes of the bacteria. This layer is known as the S-layer, and it has regularly spaced pores. S-layers exist with a variety of lattice constants between about 3 and about 30 nm; different symmetries, such as square, hexagonal, and oblique; and varying pore diameters [Sleytr et al. (1983)]. FIG. 1 is a schematic representation of an S-layer with an hexagonal array of pores.

Two strains of bacteria from the genus *Sulfolobus* have been found useful: *Sulfolobus acidocaldarius* and *Sulfolobus solfataricus*, both of which have hexagonal pore arrays. *Sulfolobus solfataricus* was isolated from a hot spring in Italy growing at pH=3.5–5 and at a temperature of 87° C. *Sulfolobus acidocaldarius* was isolated from a hot spring in Yellowstone, as described in Brock et al. (1972). Because the S-layers that these bacteria produce are so periodic and remain stable in such harsh conditions, we have employed them as patterning masks.

The S-layer of the bacteria *Sulfolobus acidocaldarius* comprises crystals having an hexagonal array of pores 5 nm in diameter with a lattice constant of 22 nm. Although the symmetry of the protein and the pores is more properly labeled trigonal because there are three groups of protein dimers around each pore, the symmetry will hereinafter be referred to as hexagonal [Taylor et al. (1982); Deatherage et al. (1983); and Lembcke et al. (1991)]. The protein making up the crystal is a glycoprotein of molecular weight 140 kD. The cytoplasmic side of the S-layer, the side that faces the inside of the bacterium, is sculpted, while the exoplasmic side, the side facing away from the bacterium, is relatively smooth with carbohydrate chains hanging off. Crystalline samples have been prepared by the inventors with dimensions of about 1–2 μm; other workers have reported samples as large as 50 μm in extent.

It is preferable to obtain clean, isolated S-layers for use as patterning masks. Usable S-layers are preferably free of contamination which might block the pores; they preferably yield fragments which can be deposited onto a substrate without clumping or sticking together; and they preferably yield fragments that retain the S-layer's natural stability, with edges that remain intact and do not fray or fall apart. It should be noted that the parameters that produce the fastest and most abundant bacterial growth do not necessarily result in the cleanest S-layers.

A new culture may be started either from cells that have been frozen at liquid nitrogen temperature, from freeze-dried cells, or from a small aliquot of live cells from a recent culture. All of the growth media described in Examples 1 and 18 can support growth if inoculated with cells from a frozen culture or from a recently grown culture. However, if a culture is being started from a freeze-dried pellet, we have found that Growth Medium 6 is preferred for getting growth started. Once the initial culture has begun growing, the cells can be transferred to another medium. It has been found that Growth Medium 1 produces S-layers that best satisfy the constraints listed above.

The point at which the cells are harvested is extremely important. When the growth rate slows and the growth curve is observed to fall away from the linear projection, cells begin to die. When the cells die, they lyse and contaminate the medium with denaturing proteins, which can be sticky, and with proteases, enzymes which attack proteins. At the same time, the acidic medium flows into the cell which normally remains at a pH near 7. This acidic medium can cross-link material to the S-layer. Once cross-linked to the S-layer, this material may not be removed later in the isolation process.

Figure 2:
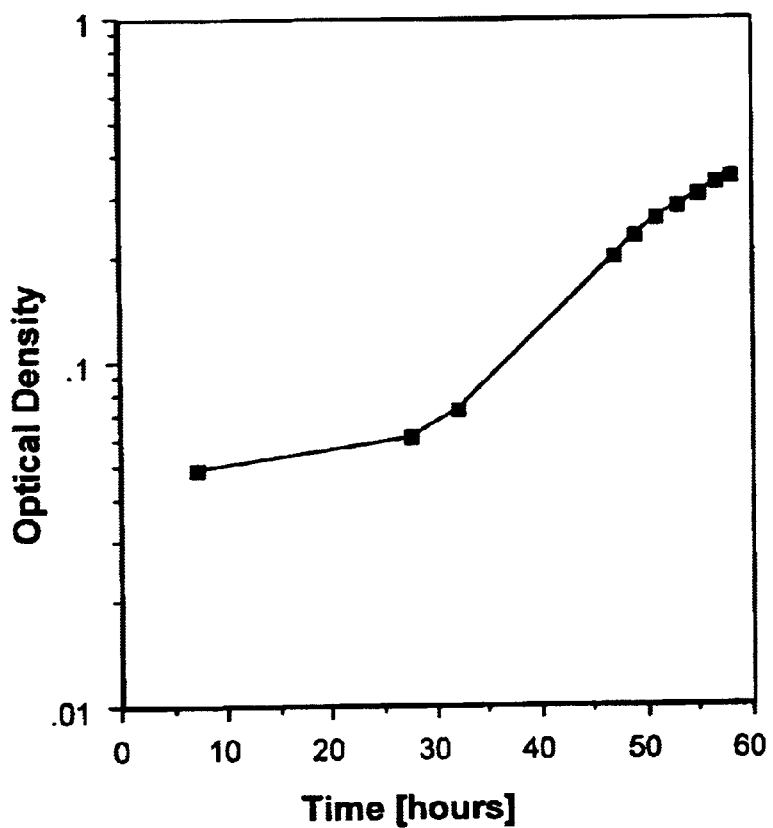
FIG. 2 is a graph of optical density at 420 nm versus time for a typical *Sulfolobus acidocaldarius* culture in Growth Medium 1 growing at 75° C.

The optical density (OD) of the culture gives a good measurement of the extent of growth of the bacteria. FIG. 2 shows a typical growth curve for *Sulfolobus acidocaldarius* in Growth Medium 1. The bacteria grow exponentially for some time, producing a linear growth curve when plotted on a logarithmic scale. As nutrients decrease and waste products increase, the growth slows, and the growth curve starts to fall away from the earlier linear behavior. The bacteria are harvested when this fall off is observed. In Growth Medium 1, *Sulfolobus acidocaldarius* starts this fall off at $OD_{420\ nm} \cong 0.35$. Therefore, it is desirable to harvest the bacteria before the $OD_{420\ nm}$ increases much above 0.35.

To allow use of the nanometer-scale, periodic pattern of the S-layer, the S-layer is preferably isolated intact from the cells. Many isolation protocols have been developed, such as those described in Weiss (1974); Michel (1980); and Grogan (1989).

*Sulfolobus acidocaldarius* is a lobed or roughly spherical bacterium. The isolation procedure leaves the S-layer protein as intact sacculi, or whole sacs. For use in accordance with the present invention, the sacculi are preferably broken up into fragments that can lie flat on a substrate.

An attractive way to improve S-layer quality is to solubilize the protein crystal and recrystallize it. All S-layers are held together by differing combinations of non-covalent bonds (hydrophobic bonds, ionic bonds, and hydrogen bonds) [Sleytr and Messner (1983)]. Chaotropic agents such as guanidine hydrochloride or urea may solubilize S-layers held together by hydrogen bonds. Once the S-layer is solubilized into protein monomers, the S-layer protein may be collected, separated from all contaminants, and allowed to recrystallize by removing the disrupting agent. In fact, Michel et al. (1980) used three different methods to solubilize and reassemble the S-layer from *Sulfolobus acidocaldarius*. Furthermore, recrystallization has the added advantage that it can be used to obtain perfect (defect-free) crystals much larger than those isolated from bacteria. Sleytr et al. (1994) have recrystallized perfect S-layer crystals 20 μm in diameter. The recrystallized S-layers were even strong enough to span 10 μm holes in a "holey" carbon film without breaking. It may be possible to create "designer S-layers" in which the recrystallization is directed by a patterned substrate to yield protein crystals of a designed shape and size.

The substrate surface may be cleaned prior to depositing one or more masks. For substrate materials such as highly ordered pyrolytic graphite (HOPG) or mica, the top surface can be cleaved away leaving an atomically flat, clean surface. For materials like silicon, the surface is preferably cleaned using a chemical cleaning solution to remove contaminating organics and hydrocarbons.

For application of S-layers to a substrate, the surface preparation preferably fulfills three requirements. First, the S-layer should be adsorbed onto the substrate with the cytoplasmic side up. Therefore, the substrate surface is preferably primed to attract the exoplasmic side. Second, the attraction is preferably strong enough to keep the adsorbed S-layers from being moved significantly by the water as it evaporates. And finally, the surface preferably yields monolayer patches if the correct concentration of S-layers is applied.

Hydrophilic surfaces are ideal for S-layer adhesion. The drop of water in which the S-layers are suspended will wet a hydrophilic surface completely, thereby ensuring a good coverage of S-layers. Also, most of the water can be wicked off, such as with a piece of filter paper, leaving a thin film of water behind. The surface of this film will move almost vertically as the water evaporates, ensuring that the S-layers stay dispersed as they adsorb onto the surface.

If the surface is hydrophobic, the drop of water in which the S-layers are suspended will not wet the surface but will form a hemispherical drop, and consequently, the coverage of S-layers on the surface will be poor. More importantly, as the water evaporates, the drop will shrink in size, and the sides of the drop will move parallel to the surface. The surface tension of the water will drag the S-layers with it creating a pile of S-layers centered at the point where the drop evaporates. However, addition of a surfactant to the aqueous suspension may decrease the surface tension and enhance the ability of the suspension to wet a hydrophobic surface.

An oxygen plasma may be employed to create a surface even more hydrophilic than the one created by chemical cleaning. The substrate can be exposed to a DC oxygen plasma at a pressure of 20 mTorr, a potential of about 1.5 kV, and a current of 20 mA for 2 minutes. An added advantage of oxygen plasma cleaning is that it can be used in conjunction with fairly hydrophobic surfaces, such as photoresist. The oxygen plasma can be used to remove the top layer of the resist and leave behind a more hydrophilic surface which improves S-layer adhesion.

The following discussion refers to the formation of titanium nanoclusters on a silicon substrate. However, it should be noted that titanium and silicon are described as examples of materials that can be used in accordance with the present invention, and nanoclusters of other materials, such as germanium and silicon, could be deposited on other substrates, using chemical reactions known to those skilled in the art.

Silicon substrates generally have a native 2–5 nm thick $SiO_2$ surface layer, which may increase in thickness with chemical cleaning. However, certain etch processes require a minimal $SiO_2$ thickness. For these processes, after chemical cleaning, the substrates may be dipped in buffered hydrofluoric acid (HF) to remove the $SiO_2$ layer and then oxygen plasma cleaned to produce an oxide layer approximately 2 nm thick.

Once a surface is cleaned, it can be further modified. For example, a silicon substrate surface may be modified with an organosilane to create a self-assembled monolayer (SAM). This SAM becomes the new surface of the substrate, supplanting the chemical properties of the original surface with the properties of the functional group on the organosilane. SAM's have the added advantage that they can be used to create a pattern on the surface because the functional group can be cleaved with 193 nm light. These patterns can be used for selective deposition of metals, protection against wet chemical etchants, and selective adsorption of biological materials (see for example, Calvert et al. (1992), Bhatia et al. (1993), Kumar and Whitesides (1993), Calvert et al. (1994), Kumar et al. (1994), Wilbur et al. (1994), Kim et al. (1995), Lercel et al. (1996), and St. John and Craighead (1996)).

Figure 3:
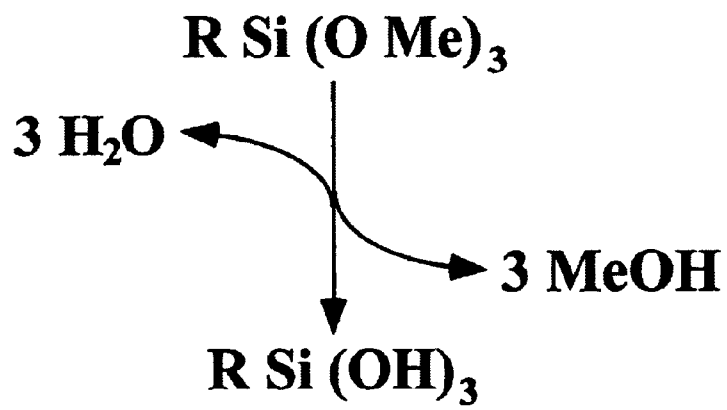
FIG. 3 is a schematic representation of the hydrolysis of the three methoxy groups in an alkyl silane, as described in Anderson et al. (1991)

Organosilanes can be represented by the general formula, $R_nSiX_{(4-n)}$, where X is a hydrolyzable group, usually an alkoxy, an acyloxy, an amine, or a chlorine, and R is a nonhydrolyzable radical possessing the desired new functionality. See FIG. 3. When the silane bonds to a substrate, a bond between silicon and one of the X's is replaced by a bond between the substrate and the silicon atom. For example, the functional group could be chosen to bond with the carbohydrate chains on the exoplasmic side of the S-layers.

Figure 4:
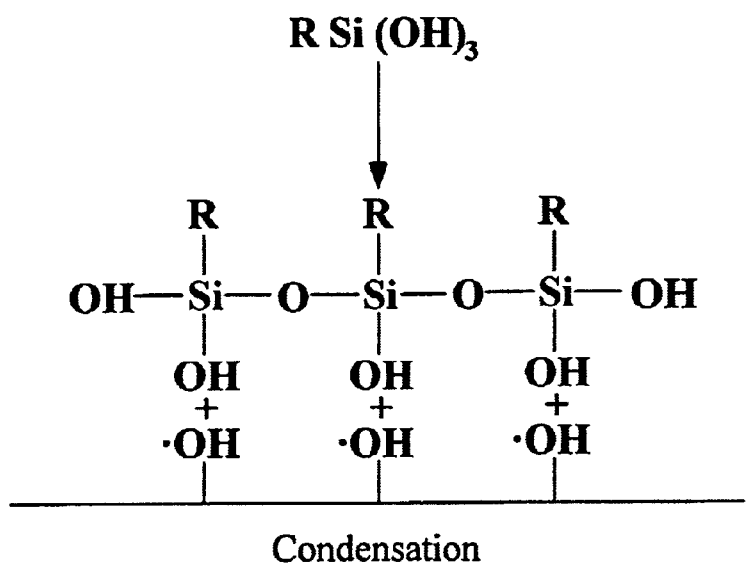
FIG. 4 is a schematic representation of oligomer condensation and hydrogen bonding to the substrate, as described in Anderson et al. (1991)
Figure 4:
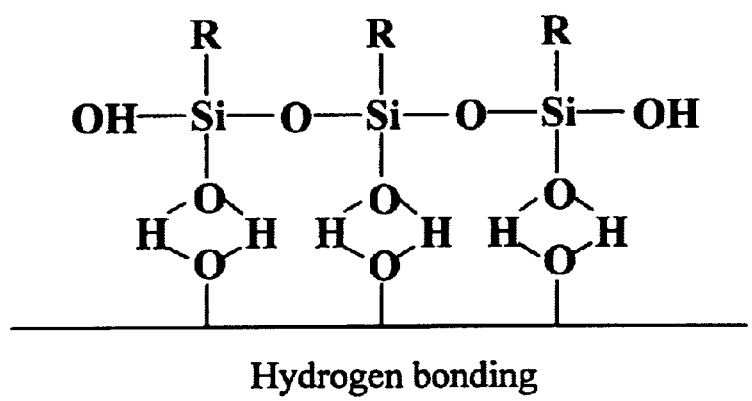

The use of silanes preferably entails four steps. First, the R groups may be hydrolyzed. Then, condensation to oligomers may occur. Third, the oligomers may hydrogen bond to the silanols on the substrates as shown in FIG. 4. Fourth, the substrates may be cured to allow formation of covalent siloxane linkages to the substrate as water is evaporated. [Anderson et al. 1991].

Silanes may also be used to promote adhesion of S-layers to noble metal substrates such as gold. However, the absence of a native oxide on noble metal substrates prevents the use of alkyl silanes because the siloxane linkages cannot be formed. Therefore, it is preferable to use silanes bond to the substrate by another mechanism. The preferred silane for noble metal substrates is one which contains a mercapto group (an SH). The mercapto groups preferably chelate the metal atoms and bond the silane to the surface. To get a good monolayer coverage, the mercapto silane is preferably applied by vapor deposition.

Figure 6:
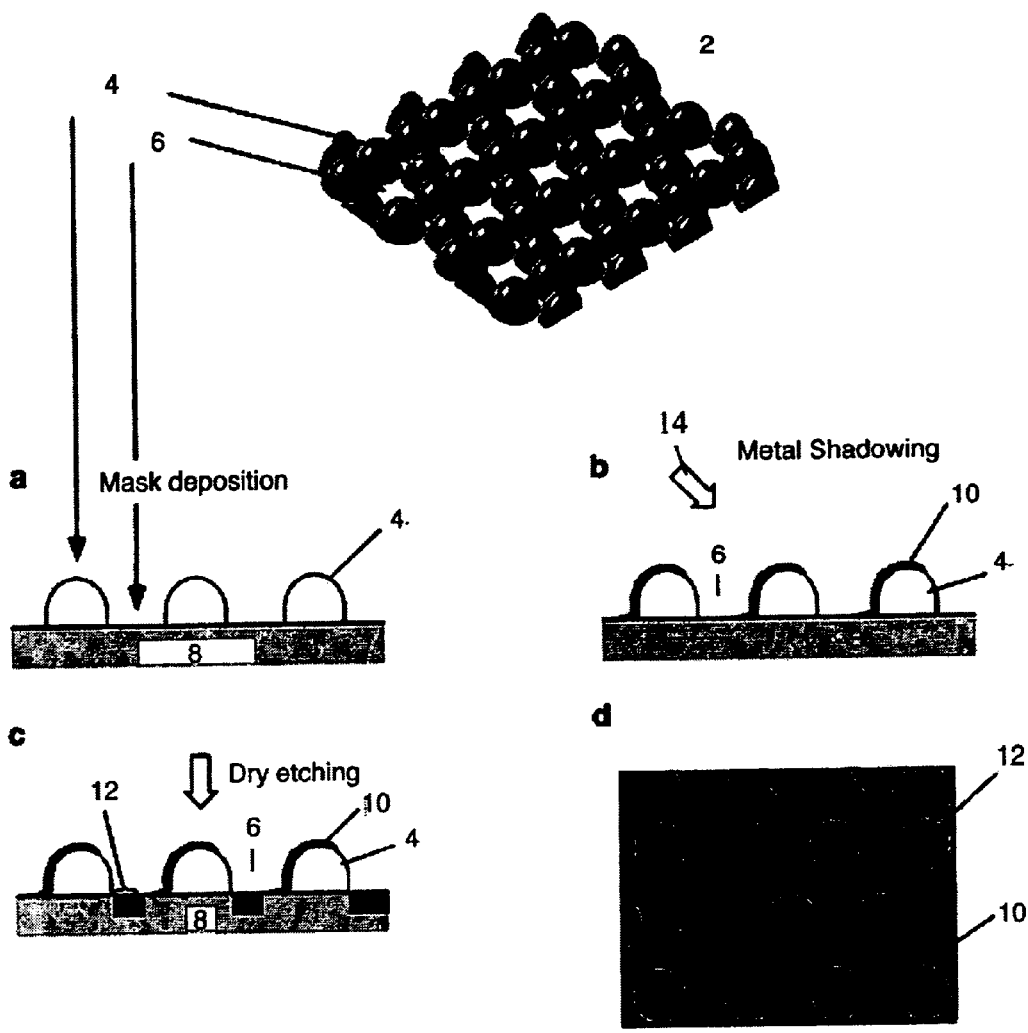
FIG. 6 is a schematic representation of (A) S-layer deposition, (B) metallization, (C) low-damage etching for pattern formation, and (D) an idealized plan-view of the final mask.

The method for pattern transfer can be understood with reference to FIG. 6. To make a sample, the S-layers can be deposited in a drop of water onto the substrate of choice. In general, a majority of the water is removed, and the S-layers adsorb onto the surface of the substrate as the remaining water evaporates. It is preferable to dry the substrate by a method which ensures that the S-layers remain as dispersed monolayers on the substrate and that the structure of the S-layer is distorted as little as possible. Suitable drying methods include air drying and use of alcohol solutions with varying ratios of alcohol/water, and critical point drying. Referring to FIG. 6a, an S-layer protein template 2 has been deposited on a substrate 8, with protein structures 4 surrounding pores 6.

If the pattern of the mask is to be transferred to the substrate, the mask preferably has a surface suitable for use with the method selected to transfer the pattern to the substrate surface. For processes such as LE4 etching, a preferred mask surface comprises a thin layer of $TiO_2$, which can be deposited on the S-layer or other mask after mounting the S-layer on the substrate surface. FIG. 6b shows the metal shadowing process schematically, with metal 14 being deposited as metal layer 10 onto protein structures 4. Because the metal is shadowed at an angle, pores 6 are not filled with metal. Once the S-layer has been metallized, the mask is completed. Other fine-grained metals, such as chromium, are also preferred masking materials.

The pattern of the mask can be transferred to the substrate in various ways. As shown schematically in FIG. 6c, dry etching can be used to etch holes 12 through non-metallized pore spaces 6 into the substrate 8. FIG. 6d shows the top of th sample, with the metallized protein 10 on top of substrate 8 and holes 12 in the substrate exposed through pores 6. A preferred method of pattern transfer is LE4 etching, which is especially well suited for etching nanopatterns defined by thin or delicate mask materials.

Following pattern transfer by LE4 etching, the mask may be stripped from the substrate. For example, a metal oxide/protein crystal mask formed with bacterial S-layer material can be stripped from the sample with a 1:1 solution of $H_2SO_4:H_2O_2$ at 130° C.

After the mask is removed from the substrate, nanoclusters can be formed in the arrayed wells on the substrate surface by suitable means, depending on the substrate composition and the desired nanocluster composition.

The following nonlimiting examples are provided to further illustrate the invention.

EXAMPLE 1

Growth of S-layer Producing Bacteria

A volume of *Sulfolobus acidocaldarius* was used to inoculate Growth Medium 1 in a ratio of 1:10 inoculant-:growth medium. The culture was incubated at 70–75° C. in an incubator shaker until the $O.D._{420}$ reached 0.35, or for about 48–65 hours.

Growth Medium 1 was prepared as follows:

|  | per liter |
|---|---|
| $K_2SO_4$ | 3.00 g |
| $(NH_4)_2SO_4$ | 1.00 g |
| $NaH_2PO_4$ | 0.50 g |
| $MgSO_4$ | 0.15 g |
| $CaCl_2.2H_2O$ | 0.10 g |

When ready to use the medium, the following was added, and the solution was brought to pH=3.4 with sulfuric acid.

| Xylose | 2.00 g |
|---|---|

EXAMPLE 2

Harvesting the Bacteria

A modified version of the procedure used by Michel et al. (1980) was followed to isolate S-layer. The cells were harvested by centrifugation at 10,410×g for 20 minutes. The supernatant was discarded, and the resulting pellets were resuspended in an 10 mM HEPES (N-[2-Hydroxyethyl] piperazine-N'-[2-ethanesulfonic acid]) solution. HEPES is a buffer that can maintain the pH and help to prevent proteins from being denatured. The cells were collected again by a 20 minute, 10,410×g centrifugation and resuspended in a 150 ml, 10 mM HEPES solution. These two centrifugation steps "washed" the cells and removed most of the growth medium and miscellaneous debris.

EXAMPLE 3

S-layer Isolation

After stirring the suspended cells from Example 2 for a few minutes to ensure that the cells are free-floating in the mixture, 0.23 g of Sodium Dodecyl Sulfate (SDS) was added to make a 0.15% solution which was stirred for 5 minutes. SDS is a strong ionic detergent which solubilizes lipid layers and denatures some proteins. It can pass through the pores in the S-layer and solubilize the cell membrane, releasing the cytoplasm into the solution.

Next, a small amount of an enzyme, DNAse I [Sigma, D4527] was added as a sloid from the tip of a spatula to solubilize the DNA. Magnesium must be present for the DNAse to function, so a small amount was added in the form of magnesium chloride (0.08 g $MgCl_2$) to activate the DNAse. The solution was heated to 37° C. and stirred for 1 hour.

The lysed cells were then collected by a 10 minute, 29,756×g centrifugation, and the pellet was resuspended in 10 ml of distilled water in a 15 ml conical tube. A small amount of Pronase (Sigma, catalog no. P-5147) was added from the tip of a spatula, and the mixture was incubated at 40° C. for 1 hour. This step solubilized any protein that might have protected the DNA from the DNAse. The Pronase was then removed by two 10 minute, 20,190×g centrifugations, and the pellet was resuspended in distilled water. After the second spin, the pellet was resuspended in 10 ml of distilled water in a 15 ml conical tube. A small amount of DNAse and 0.01 g of $MgCl_2$ were added and incubated at 40° C. for 1 hour. The DNAse was removed by two 10 minute, 20,190×g centrifugations, and the pellet was resuspended in distilled water. After the second spin, the pellet was resuspended in 50 ml of distilled water. This solution was then added to a 150 ml solution containing 0.48 g HEPES and 4 g SDS to yield a 200 ml solution of 10 mM HEPES and 2% SDS by weight. The solution was then stirred for 24 hours at room temperature. This step solubilized the plasma membrane and all proteins with the exception of the S-layer protein and a few "tough" transmembrane proteins.

After the 24 hour incubation, the S-layers were collected by a 15 minute, 29,756×g centrifugation. The pellets were resuspended in a small amount of distilled water and added to a 60° C., 2% SDS solution and stirred for 1 hour. This step removed the remaining proteins, leaving only the S-layer protein which was collected by a 15 minute, 29,756×g centrifugation. The supernatant was discarded, and the pellets were resuspended in a small amount of distilled water. This centrifugation/resuspension process was repeated at least 3 times until all of the SDS and as much as possible of the remaining random contaminants had been removed. The final pellet was resuspended in approximately 3.5 ml of distilled water and stored at 4° C. until needed.

EXAMPLE 4

Breaking up Intact S-layer Sacs

The whole S-layer sacs in the final suspension from Example 3 were broken into smaller fragments by sonication. To sonicate the whole sacs, 1 ml of the whole sac suspension was placed in a cryovial which in turn was placed in a beaker filled with crushed ice. The ice prevented the S-layers from being heated significantly by the sonication. Using a Branson Sonicator with the microtip piezo attached and the power output set at 1 and the duty cycle set at 50%, the sacs were sonicated for four cycles of 20 seconds of sonication and 10 seconds of rest.

The fragments were separated by size with differential centrifugations, progressively longer and faster. The first centrifugation lasted 15 minutes at 11,950×g. The resulting pellet was labelled A, and contained predominantly whole sacs that were not broken up. The supernatant was again centrifuged at 11,950×g for 30 minutes to yield a second pellet, labelled B. The supernatant was then centrifuged again at 11,950×g for 30 minutes to yield a third pellet, labelled C. Finally, the supernatant was centrifuged at 47,800×g for 30 minutes to yield a fourth pellet, labelled D. All pellets were resuspended with 200–400 µl of distilled water and stored at 4° C. The B and C pellets contained S-layer fragments of about 1–1.5 microns in size, which were useful as masks for subsequent experiments. The D pellet included only tiny fragments of S-layer.

EXAMPLE 5

Substrate Preparation

A silicon (100) substrate was cleaned in a 3:7 solution of $H_2O_2$:$H_2SO_4$ at 60° C. for 15 min. Native $SiO_2$ was removed from the sample surface with a buffered oxide etch, and the sample was placed in oxygen plasma for 2 min at 20 mtorr O2, 1.5 kV, and 20 mA to create a new, thinner hydrophilic $SiO_2$ surface suitable for adsorbing the protein crystals from Example 4.

EXAMPLE 6

Self-Assembly with Silanes

A 2% solution was made by mixing 100 µl of 2-(trimethoxysilyl)ethyl-2-pyridine in 10 ml reagent grade toluene. There was enough water in the toluene to hydrolyze the methoxy groups, leaving hydroxyl groups on the silicon and creating the by-product methanol, shown in FIG. 3. A small amount of butyl amine was added to help catalyze the hydrolysis. To insure that the methoxy groups were fully hydrolyzed, the solution was allowed to sit for five minutes. The silicon substrate prepared in Example 5 was then added. The substrate was left in the silane solution for approximately twenty minutes and then removed, rinsed with isopropyl alcohol (IPA), and blown dry with nitrogen.

When the methoxy groups have been hydrolyzed, condensation to oligomers may occur. The oligomers may then hydrogen bond to the SiOH groups on the substrate surface as shown in FIG. 4.

The substrate was then cured in an oven for ten minutes at 110° C. to allow covalent siloxane linkages to the substrate to be formed as water evaporated. The remaining SiOH groups on the substrate surface either bonded with each other or remained free [Anderson et al. (1991).

EXAMPLE 7

Self-Assembly with Silanes on Noble Metal Substrates

Gold substrates were placed in a desiccator under vacuum with a few milliliters of a solution of 3-mercaptopropyltrimethoxysilane in toluene for one hour. No curing was required.

EXAMPLE 8

Deposition of S-Layers on a Substrate Surface, Using Air Drying

A 4×4 mm piece of silicon (100) is prepared as described in Examples 5 and 6. A 6 µl drop of S-layers suspended in distilled water is placed on the silicon surface. After 20 or 30 seconds, a piece of filter paper is touched to the side of the silicon piece so that it comes in contact with the water drop. The filter paper is held in place until no more water can be removed from the surface. The silicon surface is hydrophilic, and a thin film of water remains on the surface of the silicon. This water is then allowed to evaporate in air. This method is the drying method of choice when the sample has been cleaned with an oxygen plasma, as described in Example 5. The surface tension of the drying water distorts the structure of the S-layer slightly.

EXAMPLE 9

T-Butyl Alcohol Drying

A 4×4 mm piece of silicon (100) was prepared as described in Examples 5 and 6. A 6 µl drop of S-layers suspended in distilled water was placed on the silicon surface and allowed to incubate for 1 minute. The sample was then placed in a 15% by volume t-butyl alcohol aqueous solution for 1 minute. The sample was then transferred to a solution of higher t-butyl alcohol concentration every minute until it reached a portion of 100% t-butyl alcohol. It was then transferred to two more 100% portions before it was removed and allowed to dry in air. Because the surface tension of t-butyl alcohol is much less than that of water, the adsorbed S-layers experience less shear force as the t-butyl alcohol evaporates than when an aqueous suspension is allowed to dry, as described in Example 8. Also, because the water in the S-layer is gradually replaced by t-butyl alcohol, the structure of the S-layer is better preserved as it dries. The drawback of this drying method is that the amount of S-layer adsorbed on the silicon substrate is usually much less than the coverage obtained by air drying.

EXAMPLE 10

Critical Point Drying

A sample was prepared and dried as in example 9, except that a graded series of ethyl alcohol was used, and the final 100% ethyl alcohol solution was in a critical point drying machine. The ethyl alcohol was replaced by liquid carbon dioxide, and the machine, controlling temperature and pressure, moved around the critical point in the phase diagram until the carbon dioxide was a gas and the sample was dry. The graded ethanol series removed most of the S-layer from the substrate.

A t-butyl alcohol series may be used if care is taken in the critical point drying process to prevent the t-butyl alcohol from freezing when the liquid carbon dioxide is introduced.

EXAMPLE 11

S-Layer Deposition on Hydrophobic Surfaces

A 4×4 mm piece of silicon (100) was prepared as described in Examples 5 and 6. S-layers were suspended in a solution of 0.014% by volume Triton X-100, a surfactant, in distilled water. A 6 µl drop of S-layers suspended in the detergent solution distilled water was placed on the silicon surface. The S-layers were deposited uniformly on the substrate, with minimal residue after drying.

EXAMPLE 12

S-Layer Metallization

A sample was prepared as described in Example 8. The protein crystals deposited on the prepared silicon surface were coated with titanium at a rate of 0.1 nm s$^{-1}$ at an angle 40° from normal incidence by electron beam evaporation. The average titanium thickness was 1.2 nm, as measured using a calibrated quartz crystal monitor in the deposition system. The amount of titanium deposited, and thus the ultimate thickness of the mask, was limited by the need to avoid blocking the pores when the oxide forms.

Figure 5:
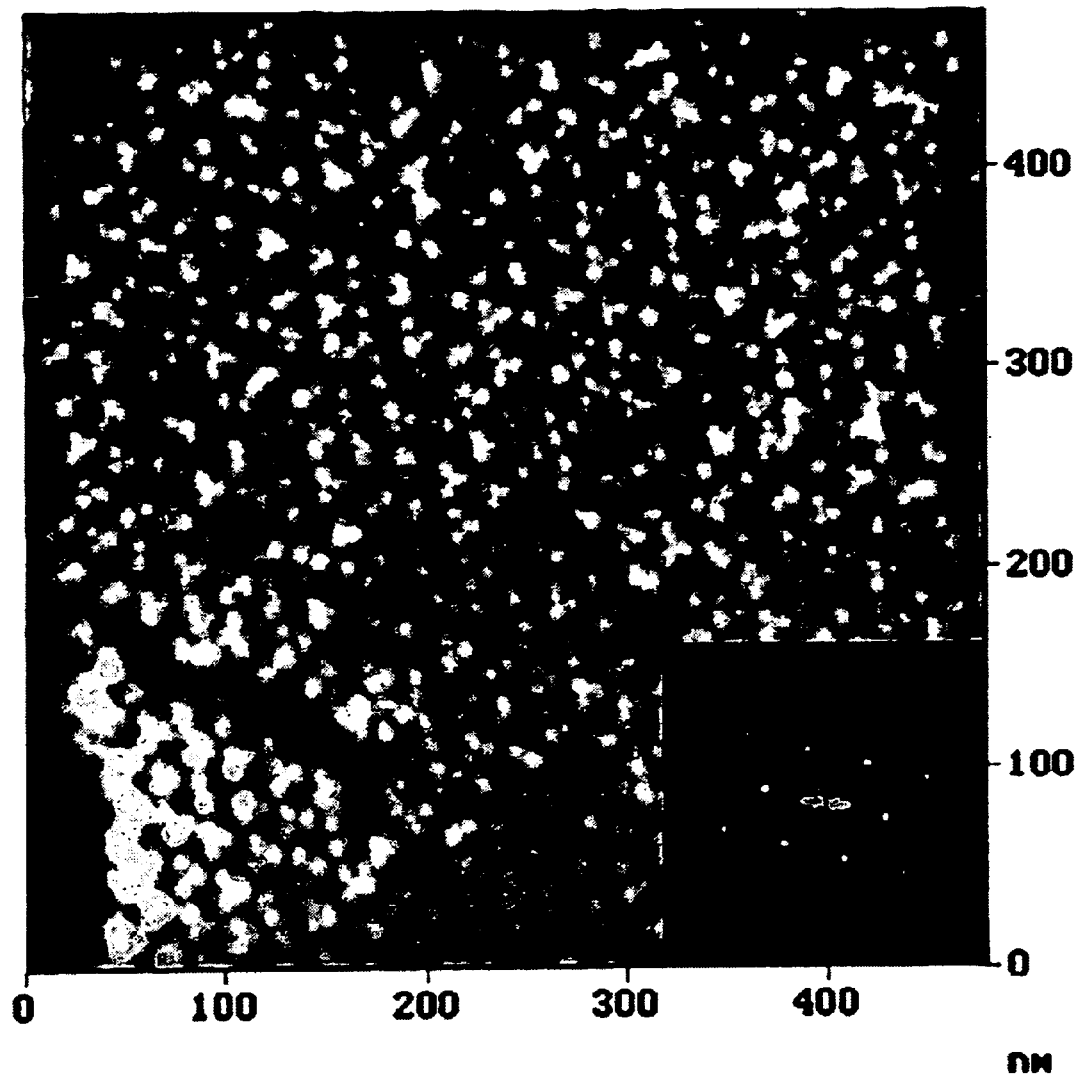
FIG. 5 is an AFM image of an S-layer coated with 12 Å of Ti in accordance with the present invention, with the arrow pointing to a hexagonal group of holes, appearing as dark spots, and the inset showing a Fourier transform of the image, with the six spots indicating the hexagonal symmetry.

The titanium film was then oxidized by exposure to air. The titanium oxide thickness was measured to be 3.5 nm by AFM and confirmed by spectroscopic ellipsometry. The metallized pore diameter was about 6 nm. An AFM image of a metallized S-layer is shown in FIG. 5. Once the S-layer has been metallized, the mask is completed.

EXAMPLE 14

LE4 Etching

A silicon substrate was prepared with a metal oxide/protein crystal mask as described in Example 12. Because the $TiO_2$ mask was much thinner than standard masking materials used in microfabrication processes, it was susceptible to removal during standard ion-based dry etching. The entire The sample was LE4 etched in the anode glow of a DC plasma at 100 mtorr of pure hydrogen at 50 sccm gas flow and room temperature. The sample was maintained at the floating potential of the plasma during the etching process. The mask pattern was transferred to the silicon substrate by LE4 etching using the methods described in U.S. Pat. Nos. 5,882,538; 5,917,285; 6,027,663; and 6,033,587.

EXAMPLE 15

Stripping the Mask from the Substrate

Figure 7:
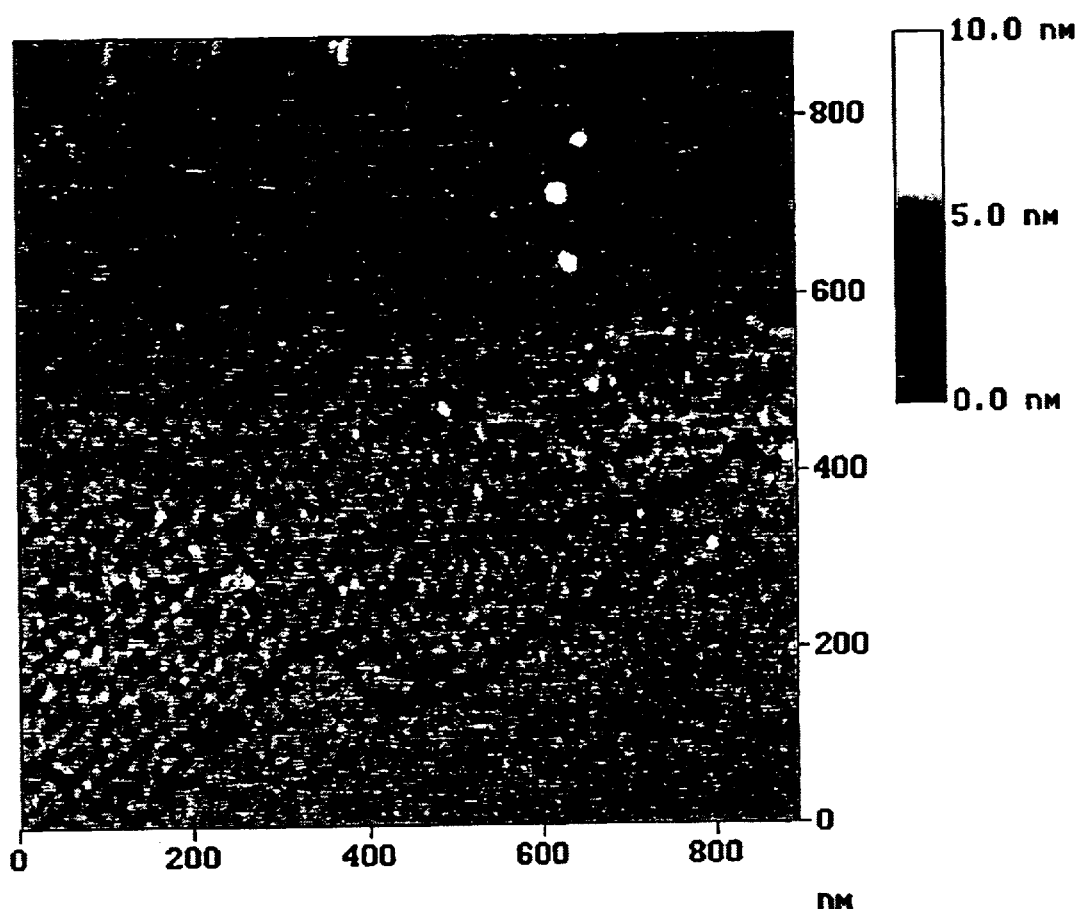
FIG. 7 is an AFM image of the bare LE4 etched Si surface after a proteincrystal/metal oxide mask has been removed from the surface.

Following pattern transfer by LE4 etching, the metal oxide/protein crystal mask formed with bacterial S-layer material was stripped from the silicon substrate by exposure to a 1:1 solution of $H_2SO_4$:$H_2O_2$ at 130° C. for 1 hour. XPS measurements after stripping showed that the $TiO_2$ was completely removed. The $SiO_2$ layer was removed by dipping the sample in buffered HF for 30 s, rinsing with distilled water, and blowing dry with $N_2$. Atomic force microscopy (AFM) of the bare Si surface revealed a hexagonal array of holes with a lattice constant of 22 nm, identical to the lattice constant of the protein crystal lattice used for patterning the surface, as shown in FIG. 7.

Together, these results demonstrate unambiguously that the biologically-derived nanopattern was transferred into the Si (100) crystal by LE4 etching.

EXAMPLE 16

Atomic Force Microscopy of Surfaces

Figure 8:
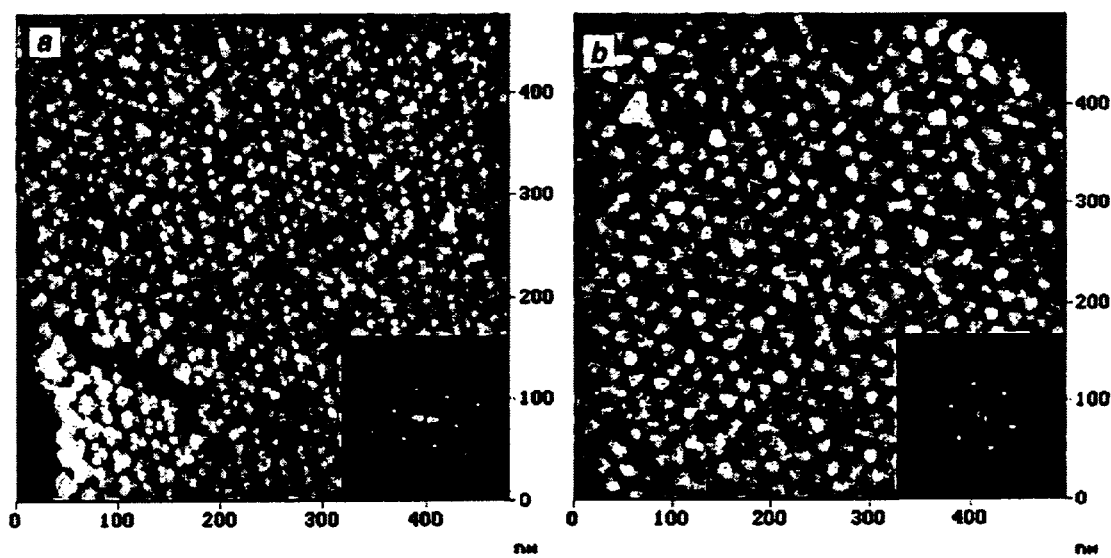
FIG. 8 shows AFM images of metallized protein crystals on Si (100) (a) before and (b) after LE4 etching; the insets are Fourier transforms of the hexagonal symmetry of the pattern highlighted by the black arrows in the main images.

Sample surfaces were imaged by AFM before and after etching, as shown in FIG. 8. The AFM probe consists of a sharp tip extending from the underside and end of a cantilever. A laser is reflected off the top of the cantilever and directed to a set of photodetectors. As the tip is scanned across the surface, changes in surface topography and composition produce forces on the tip which deflect the cantilever as a result of the sum of the forces acting upon the tip. These forces include the fluid film damping force at a tip-sample separation of approximately 10 $\mu$m; electrostatic forces which can be attractive or repulsive at 0.1–1 $\mu$m; the fluid surface tension force at a distance of 10–200 nm from the sample surface; and weak attractive Van der Waals forces a distance of about an Ångstrom above the surface. When the cantilever is deflected, the laser spot on the photodetectors moves. From these deflections, the AFM computer generates an image of the surface topography as the tip is scanned across the surface.

The correlation between the image constructed by the AFM and the actual topography of the sample is not straightforward. In general, features that protrude from the surface are broadened, and features that are recessed into the surface appear narrower than they actually are. If the actual hole has a smaller diameter than the end of the tip, the AFM tip cannot fit into the hole and never comes in contact with the bottom of the hole. The typical radius of curvature for a $SiN_4$ tip is 40–50 nm; the typical radius of curvature for an etched Si tip is 5–10 nm. Because the holes in the S-layer pattern are approximately 5 nm in diameter, even the sharpest etched Si tips cannot provide any data about the bottom of the holes after the pattern has been etched into the substrate. Moreover, if the tip is mechanically prevented from reaching the bottom of the holes, we cannot measure their depth with AFM.

In FIG. 8, height of the surface features is represented by brightness in the AFM images; therefore, the holes in the S-layer are the dark areas, such as those indicated by the arrows. The hexagonal symmetry of the pattern is clearly evident in both images and in the Fourier transforms shown in the inserts. Because the diameters of the holes were comparable to the diameter of the AFM tip, the depth of the etched holes could not be measured by AFM. Therefore, another technique is needed to measure the depth of these narrow holes in the etched samples, which is about 10–20 nm.

EXAMPLE 16

High Resolution Cross-sectional Transmission Electron Microscopy (HRXTEM)

HRXTEM was used to study the dimensions of the etched holes. High resolution cross-sectional transmission electron microscopy (HRXTEM) was used to supplement the information obtained by AFM as well as to determine the depth of the holes. To perform HRXTEM, the sample must be cross sectioned and then thinned to less than 100 nm in thickness and examined with transmission electron microscopy (TEM). By viewing the nanostructured samples in cross-section, the hole depths and thickness of the various layers in the system, such as oxide layers, damage layers, etc., can be measured.

Figure 9:
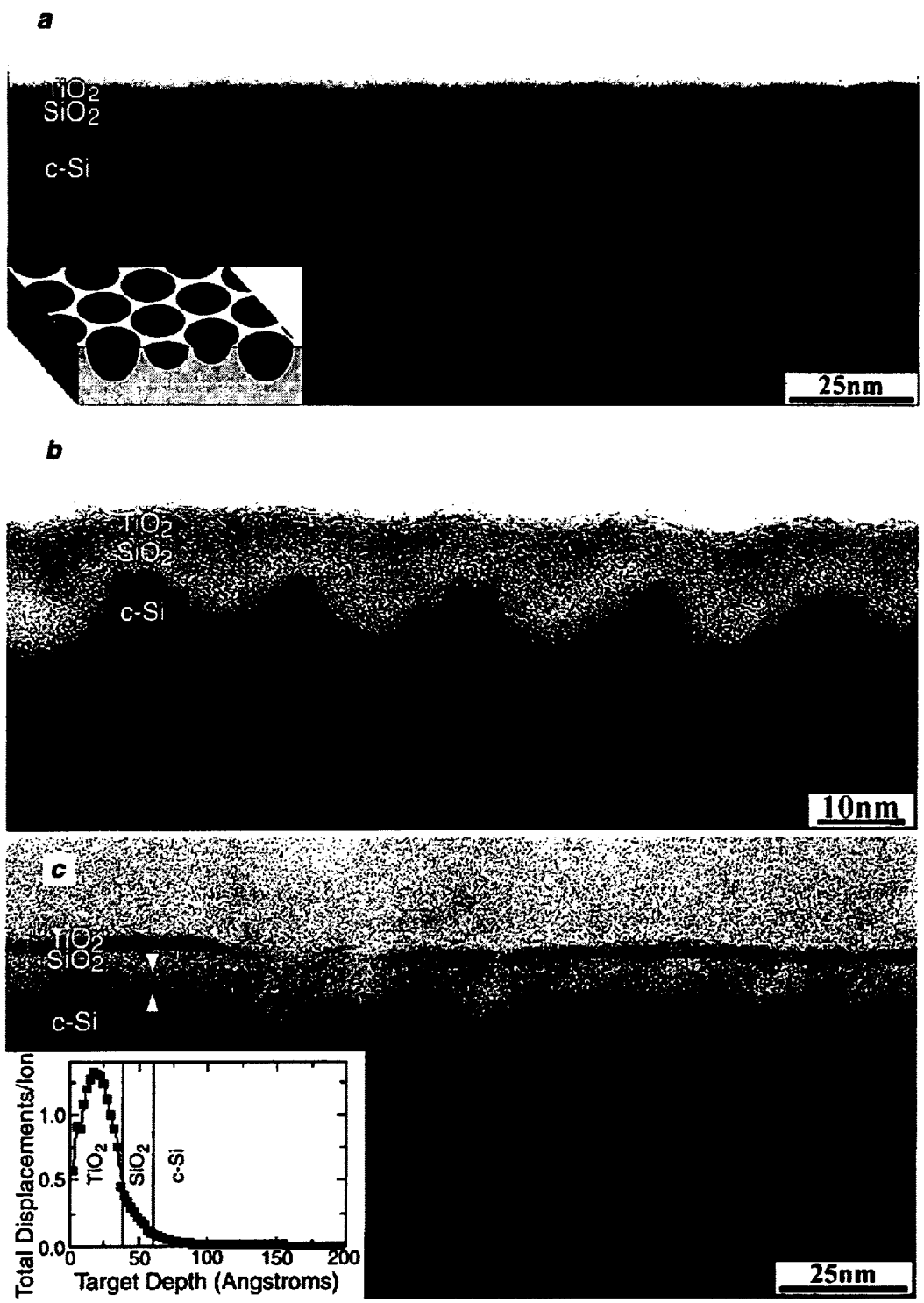
FIG. 9(a) is a high resolution cross-sectional transmission electron micrograph (HRXTRM) image of a protein crystal/metal oxide masked Si exposed only to LE4 etching, with the inset showing the schematically the result of an arbitrary cross-section of an ordered surface.
FIG. 9(b) is a higher magnification HRXTRM image of a protein crystal/metal oxide masked Si exposed only to LE4 etching, showing Si lattice fringes.
FIG. 9(c) is an HRXTRM image of a protein crystal/metal oxide masked Si surface exposed to 2 keV $Ar^+$ ion milling and then to LE4 etching, with a subsurface damage layer indicated by the arrows, and the inset showing the results of a TRIM calculation showing the total number of lattice displacements/ion versus target depth.

FIG. 9a shows a low magnification view of an area of the sample patterned by LE4 etching. Because the cross-section is at in arbitrary orientation relative to the rows of etched holes, inhomogeneities in the pattern and cm missing holes may appear in the image, as represented schematically in the inset to FIG. 9a. Comparing the deepest holes, in the TEM image with fully cross-sectioned holes in the inset shows that the periodic nanometer-scale pattern of the protein crystal mask has been etched into the silicon lattice to a depth of 10 nm.

In FIG. 9a, the holes in the mask appear as periodic light areas in the $TiO_2$ layer. The etched holes below them are hemispherical and clearly undercut the mask. The isotropic etching widens the holes to a diameter of 18 nm. In previous experiments, Si (100) patterned by LE4 etching on a micrometer length scale with metal and with dielectric masks showed etch directionality of various degrees, from vertical sidewalls to classical isotropic undercut, depending on the etch conditions. These earlier results suggest that the present biologically-derived nanopatterns can be transferred into Si (100)) with a broad range of controlled etch profiles. A series of such patterned surfaces would reveal effects of the etched feature's curvature on subsequent formation of nanoclusters on the etched surface.

FIG. 9b shows a high magnification view of an area etched by LE4. Lattice fringes clearly evident around the holes demonstrate that the holes were etched through the native $SiO_2$ layer beneath the protein mask and into the crystalline Si without the lattice displacement damage typically caused by conventional ion beam and plasma etch methods. To compare the effects of LE4 etching and ion milling on the Si lattice, a sample masked with metal oxide/protein crystal prepared as above was ion milled with 2 keV $Ar^+$ ions at a current density of 7 $\mu$A cm-2 for 12 min prior to exposure to LE4 etching.

FIG. 9c shows a low magnification TEM image of this sample. The patterned holes have been broadened, and a subsurface region 2 nm thick has been rendered amorphous. The corresponding penetration depth (about 100 A) agrees with TRIM calculations (see inset to FIG. 9c) for 2 keV $Ar^+$ ions incident from the normal direction on a similar system. The absence of this sub-surface damage layer in the sample exposed only to LE4 etching demonstrates that LE4 etching does not inflict lattice damage.

EXAMPLE 17

Formation of Nanoclusters on Etched Surfaces

Figure 10:
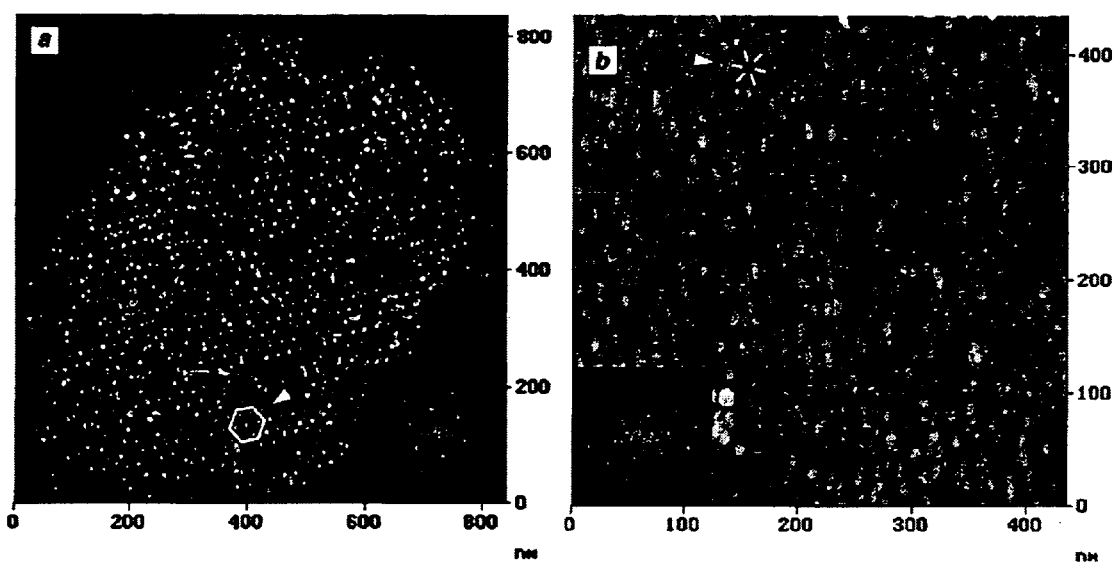
FIG. 10(a) is an AFM image of a nanocluster array formed on an LE4 etched surface by electron beam evaporation of titanium after an oxygen plasma exposure, with the white arrow highlighting a single hexagon of dots and the inset showing a Fourier transform of the image.
FIG. 10(b) is an AFM image of a sample processed as in (a) but without the oxygen plasma exposure, with the white arrow showing a single hexagon of holes and the inset showing a Fourier transform of the image.

After the mask was removed from the substrate, nanoclusters were formed in the arrayed wells on the substrate surface. A sample of Si (100) sample was prepared as described in Example 12 and patterned by LE4 etching as described in Example 13. The mask was removed as in Example 14. The $SiO_2$ layer was left intact, and the sample was cleaved into two pieces. One piece was exposed to a DC oxygen plasma for 30 s at 20 mtorr, 1 keV, and about 8 mA. The second piece was not exposed to oxygen plasma. 1.2 nm of titanium is then deposited by electron beam evaporation at normal incidence on each piece. Upon examination with AFM, the piece exposed to oxygen plasma revealed ordered arrays of nanoclusters about 5 nm in diameter with the same symmetry and lattice constant as the protein crystal (FIG. 10a). The piece not exposed to oxygen plasma showed no evidence of nanoclusters (FIG. 10b).

In FIG. 10a, each cluster is detected by AFM as a protrusion above the surrounding surface. Because the distance between the clusters is comparable with, and likely smaller than, the diameter of the AFM tip, it is impossible to obtain a detailed high magnification image showing the shape, the periphery, and the substrate surface around each cluster. Increasing the magnification in FIG. 10a only produces a blurred image and provides no further structural details.

EXAMPLE 19

Growth of S-layer Producing Bacteria in other Media

The following growth media were each innoculated with *Sulfolobus acidocaldarius*, as described in Example 1.

GROWTH MEDIUM 2

"XG Medium"

|  | per liter |
|---|---|
| $K_2SO_4$ | 3.00 g |
| $NaH_2PO_4$ | 0.50 g |
| $MgSO_4$ | 0.15 g |
| $CaCl_2 \cdot 2H_2O$ | 0.10 g |

When ready to use medium, add the following and then bring to pH=3.4 with sulfuric acid.

| Xylose | 2.00 g |
|---|---|
| L-Glutamine | 1.00 g |

GROWTH MEDIUM 3

"XCAA Medium"

|  | per liter |
|---|---|
| $K_2SO_4$ | 3.00 g |
| $NaH_2PO_4$ | 0.50 g |
| $MgSO_4$ | 0.15 g |
| $CaCl_2 \cdot 2H_2O$ | 0.10 g |

When ready to use medium, add the following and then bring to pH=3.4 with sulfuric acid.

| Xylose | 2.00 g |
|---|---|
| Casein, acid hydrolysates | 1.00 g |

GROWTH MEDIUM 4

"Grogan's Medium"

|  | per liter |
|---|---|
| $K_2SO_4$ | 3.00 g |
| $NaH_2PO_4$ | 0.5 g |
| $MgSO_4$ | 0.15 g |
| $CaCl_2 \cdot 2H_2O$ | 0.10 g |
| Trace Minerals | |

When ready to use medium, add Tryptone and then bring to pH=3.0 with sulfuric acid

| Tryptone | 2.00 g |
|---|---|

GROWTH MEDIUM 5

"Mary's Medium"

|  | per liter |
|---|---|
| $(NH_4)_2SO_4$ | 1.30 g |
| $KH_2PO_4$ | 0.28 g |
| $MgSO_4$ | 0.25 g |
| $CaCl_2$ | 0.07 g |
| $FeCl_3$ | 0.02 g |
| Yeast Extract | 1.00 g |
| Solution A (stirred well) | 1.00 ml |
| Solution B | 0.01 ml |

Bring to pH=2.3 with sulfuric acid and autoclave.

Solution A:

| $MnCl_2$ | 0.18 g |
|---|---|
| $Na_2B_4O_7$ | 0.45 g |
| $ZnSO_4$ | 0.22 g |

Bring volume to 100 ml with distilled $H_2O$ and store at 4° C.

Solution B:

| $CuCl_2$ | 0.50 g |
|---|---|
| $NaNO_3$ | 0.30 g |
| $CoSO_4$ | 0.10 g |

Bring volume to 100 ml with distilled $H_2O$ and store at 4° C.

GROWTH MEDIUM 6

"ATCC 1723 Medium"

|  | per liter |
|---|---|
| $(NH_4)_2SO_4$ | 1.3 g |
| $KH_2PO_4$ | 0.28 g |
| $MgSO_4$ | 0.12 g |
| $CaCl_2 \cdot 2H_2O$ | 0.07 g |
| $FeCl_3 \cdot 6H_2O$ | 0.02 g |
| Tryptone | 1.00 g |
| Yeast Extract | 0.05 g |
| Solution A (stirred well) | 1.00 ml |
| Solution B | 0.01 ml |

Bring to pH=3.0 with sulfuric acid and autoclave.

Solution A:

| $MnCl_2 \cdot 4H_2O$ | 0.90 g |
|---|---|
| $Na_2B_4O_7 \cdot 10H_2O$ | 4.25 g |
| $ZnSO_4 \cdot 7H_2O$ | 0.11 g |

Bring volume to 500 ml with distilled $H_2O$ and store at 4° C.

Solution B:

| | |
|---|---|
| CuCl$_2$.2H$_2$O | 0.50 g |
| NaNO$_3$.2H$_2$O | 0.30 g |
| VOSO$_4$.2H$_2$O | 0.30 g |
| CoSO$_4$.7H$_2$O | 0.18 g |

Bring volume to 100 ml with distilled H$_2$O and store at 4° C.

GROWTH MEDIUM 7

"Allen's Medium"

| | per liter |
|---|---|
| (NH$_4$)$_2$SO$_4$ | 1.30 g |
| KH$_2$PO$_4$ | 0.28 g |
| MgSO$_4$ | 0.12 g |
| CaCl$_2$ | 0.06 g |
| Yeast Extract | 1.00 g |

Bring to pH=3.0 with sulfuric acid and autoclave.

All of the tested media supported significant bacterial growth.

EXAMPLE 19

LE4 Etching in Alternative Configuration

To demonstrate an improved rate of etching, a sample was etched in a configuration wherein the sample was placed on the anode anode of the DC plasma reactor. This configuration greatly increases the flux of incoming electrons, which in turn increases the etch rate. This alternative configuration is also described in U.S. Pat. Nos. 5,882,538; 5,917,285; 6,027,663; and 6,033,587.

Figure 11:
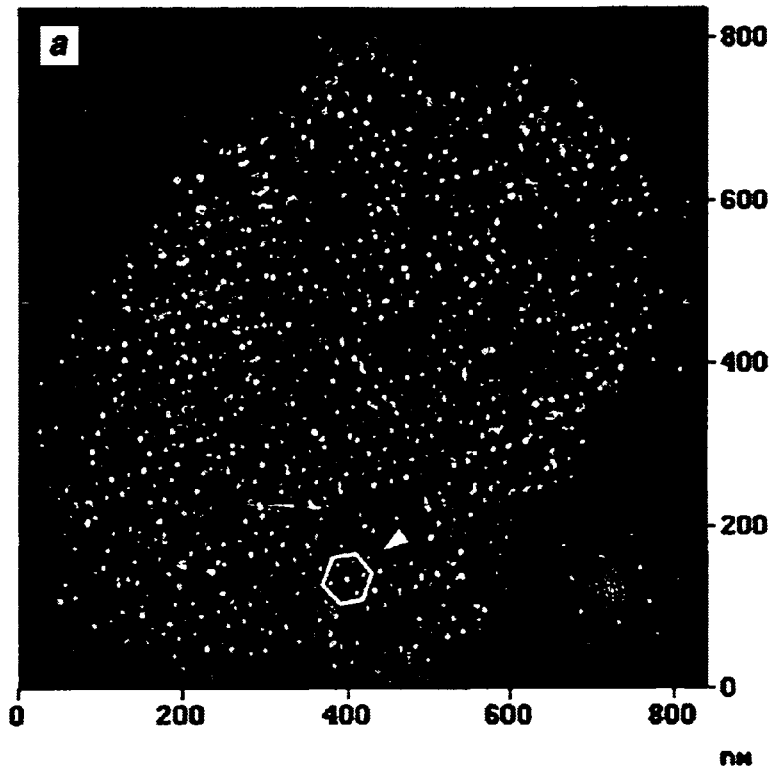
FIG. 11 is an AFM picture of quantum dot arrays formed by deposition of Ti onto a substrate that has been LE4 etched in the alternative mode, and the missing dots are the effect of contamination present on the biotemplates before etching.
Figure 11:
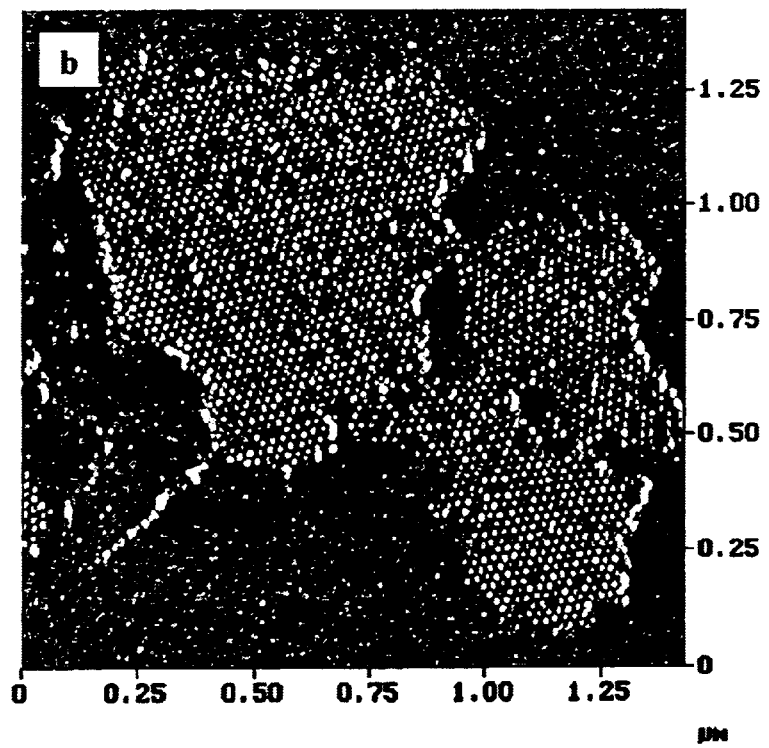

Etch times ranging from 5–60 minutes in H$_2$ were investigated with this sample configuration. Similar arrays of Ti dots to those produced in Example 13 were obtained after etching for only 15 minutes with a current of ~30 mA in H$_2$. As shown in FIG. 11, the dots appeared to have improved uniformity over those obtained when samples were etched in floating mode.

EXAMPLE 20

Preparation of Nanomasked Templates on Hydrophobic Si

A silicon (100) substrate was cleaned in a 3:7 solution of H$_2$O$_2$:H$_2$SO$_4$ at 60° C. for 15 minutes. Native SiO$_2$ was removed using HF ? S-layers were prepared as described in Examples 1–4 and suspended in a solution of dilute (<0.01% by volume Triton X-100 in distilled water. The use of oxide-free nanomasked samples improved the quality and speed of the LE4 etch process.

EXAMPLE 21

Micron-scale Lithography for Device Development

As shown in Examples 13–17, sufficiently small nanometer-scale patterns on a surface can control nucleation and growth of materials deposited on that surface and produce an ordered array of quantum dots in which each dot is precisely located at an a priori determined position. The position of each array is determined by the placement of the S-layers. To incorporate the arrays of dots into devices, it is preferable to be able to position the S-layers precisely.

Figure 12:
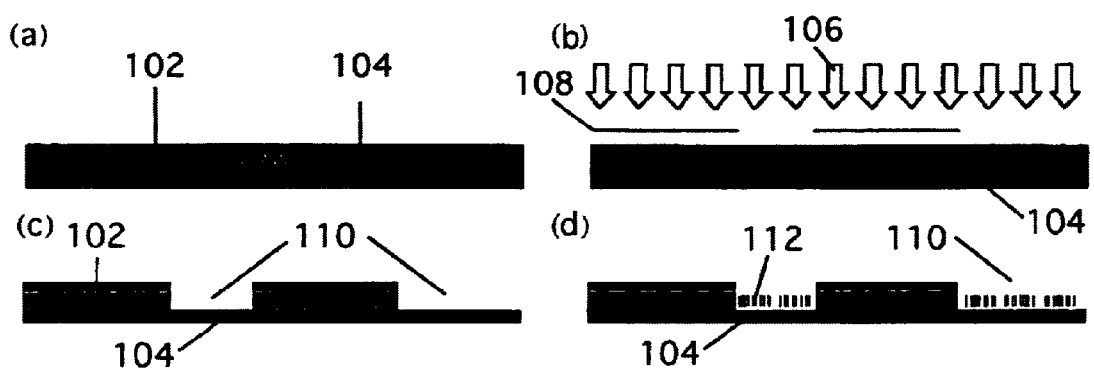
FIG. 12 is a schematic illustration showing (a) photoresist on a silicon substrate; (b) substrate patterning UV radiation; (c) removal of exposed resist by CD30; and (d) selective adsorption of protein crystal patterning elements in the exposed areas.

S-layers were selectively placed at desired locations on a substrate using a blocking scheme shown schematically in FIG. 12. Using a commercially available photoresist, Shipley 1818, a blocking layer 102 was spun onto the substrate 104. The photoresist layer 102 was then exposed with UV radiation 106 through a mask 108, as shown in FIG. 12b. The photoresist 102 was then developed, exposing the areas 110 of the substrate on which S-layers were desired, as shown in FIG. 12c. The S-layers 112 were then applied, as shown in FIG. 12d, and titanium was deposited as described in Example 12. The photoresist was then removed, leaving the protein crystals only in the exposed regions. The photoresist blocked the adhesion in the unexposed areas.

Figure 13:
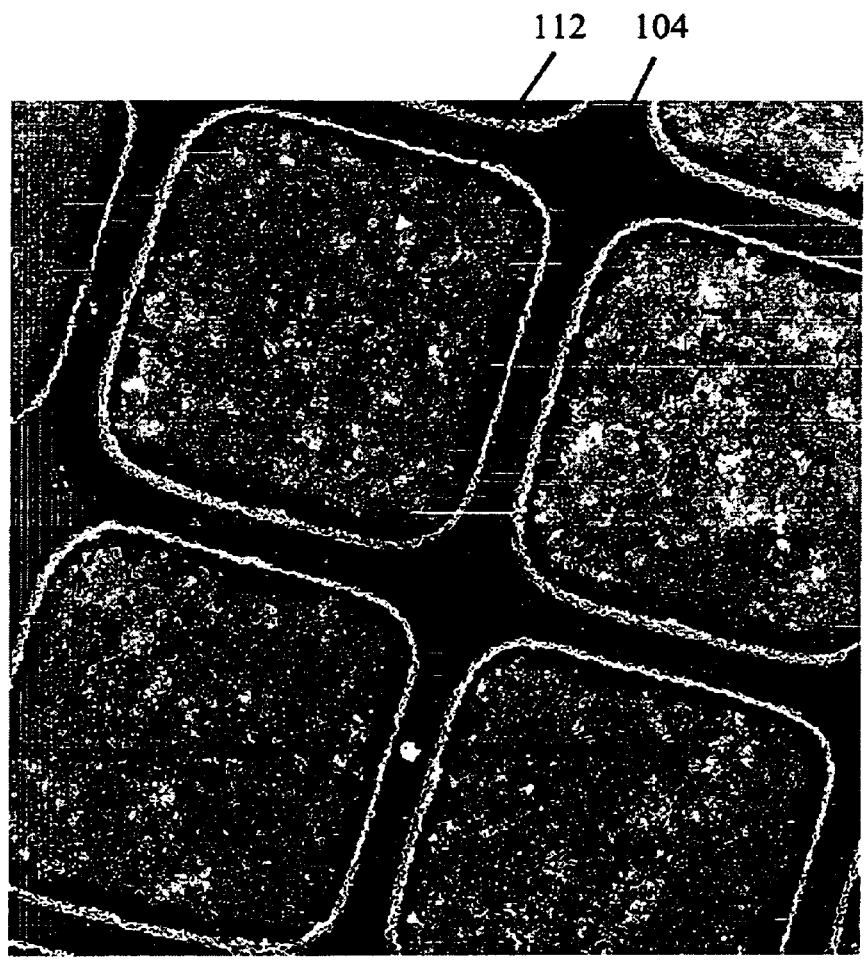
FIG. 13 is a top view AFM image of a sample after the photoresist has been removed in processing as illustrated in FIG. 12, showing the 100% selectivity of the blocking scheme.
Figure 1:
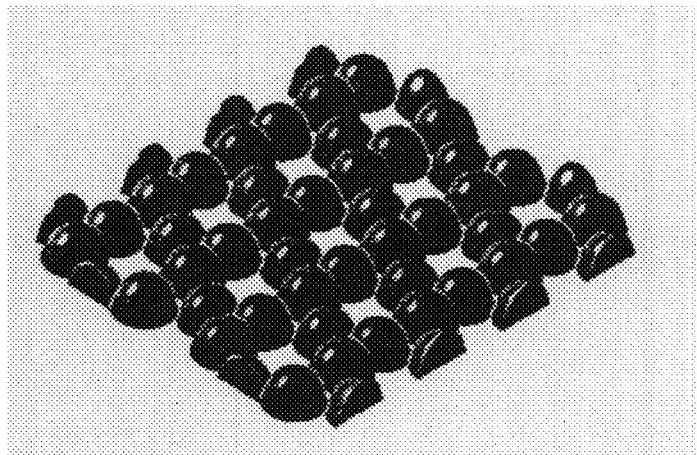
Figure 2:
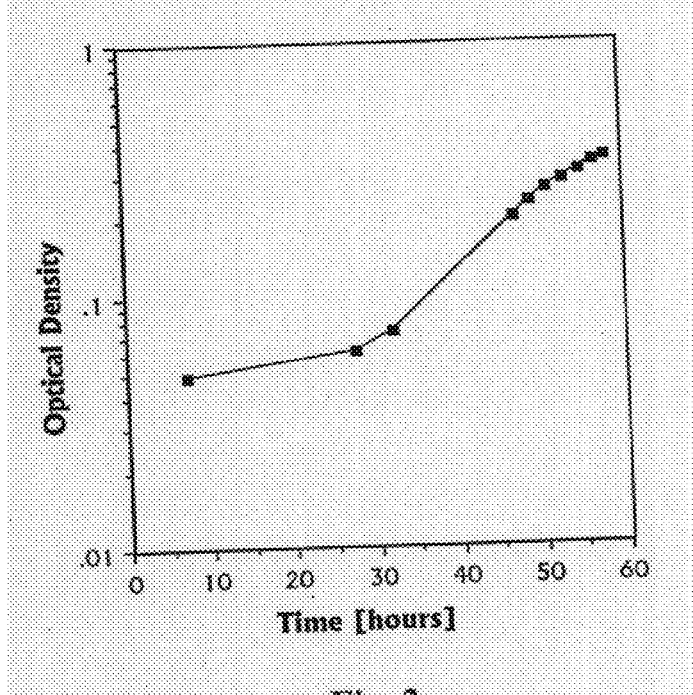
Figure 3:
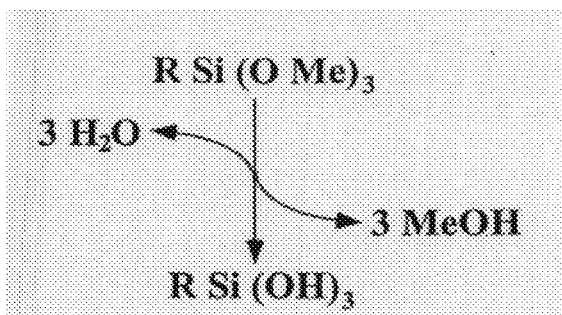
Figure 4:
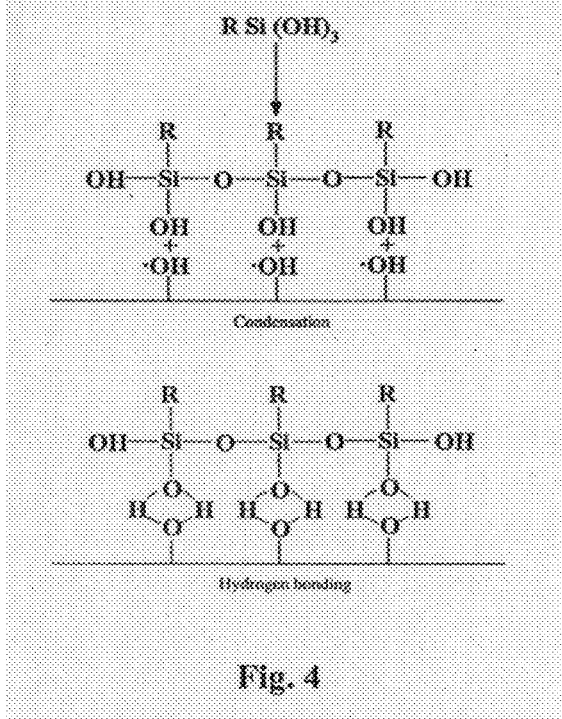
Figure 5:
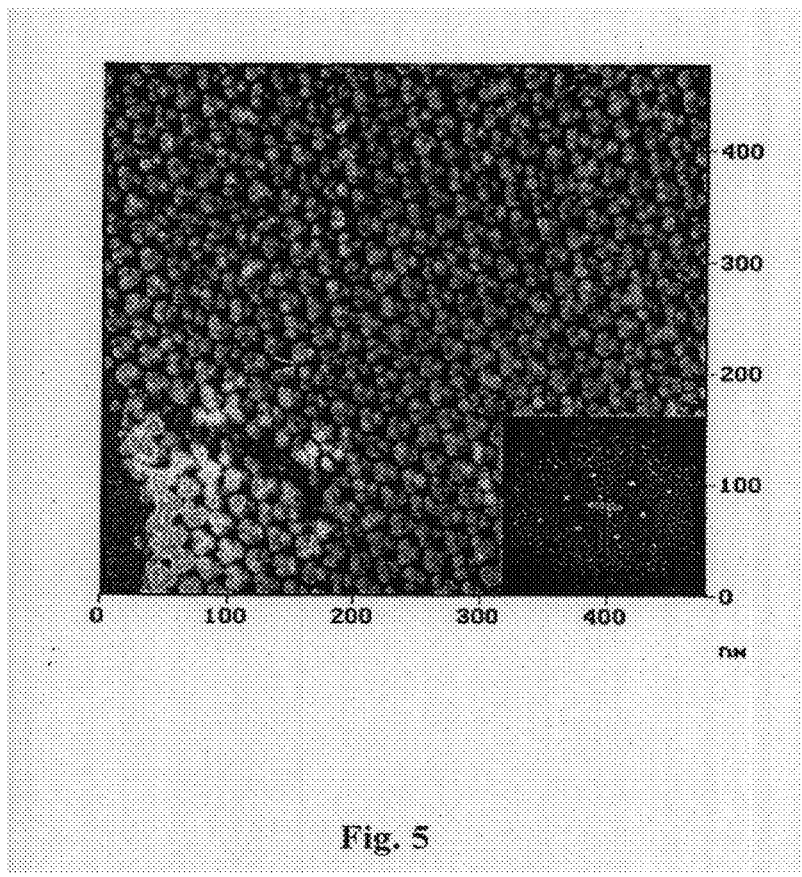
Figure 6:
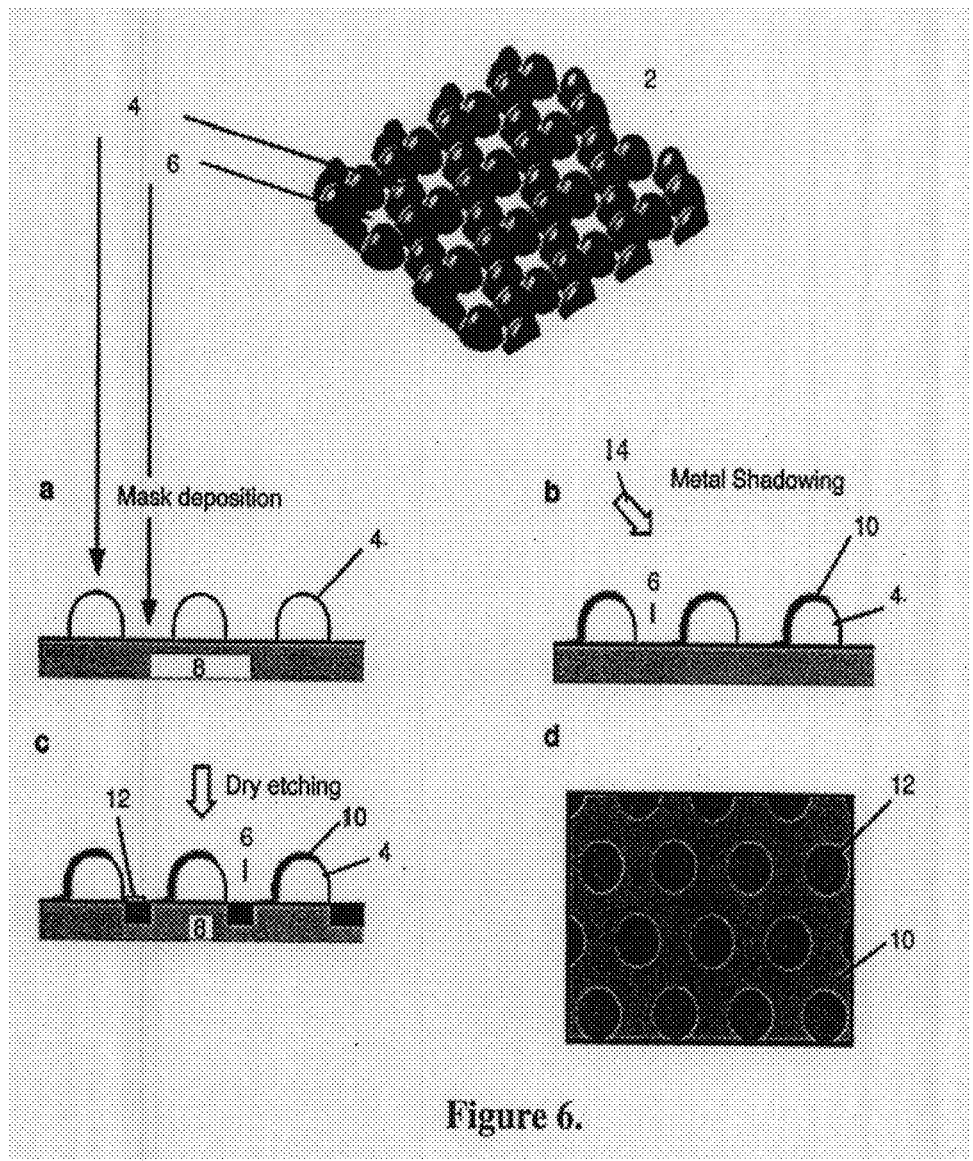
Figure 7:
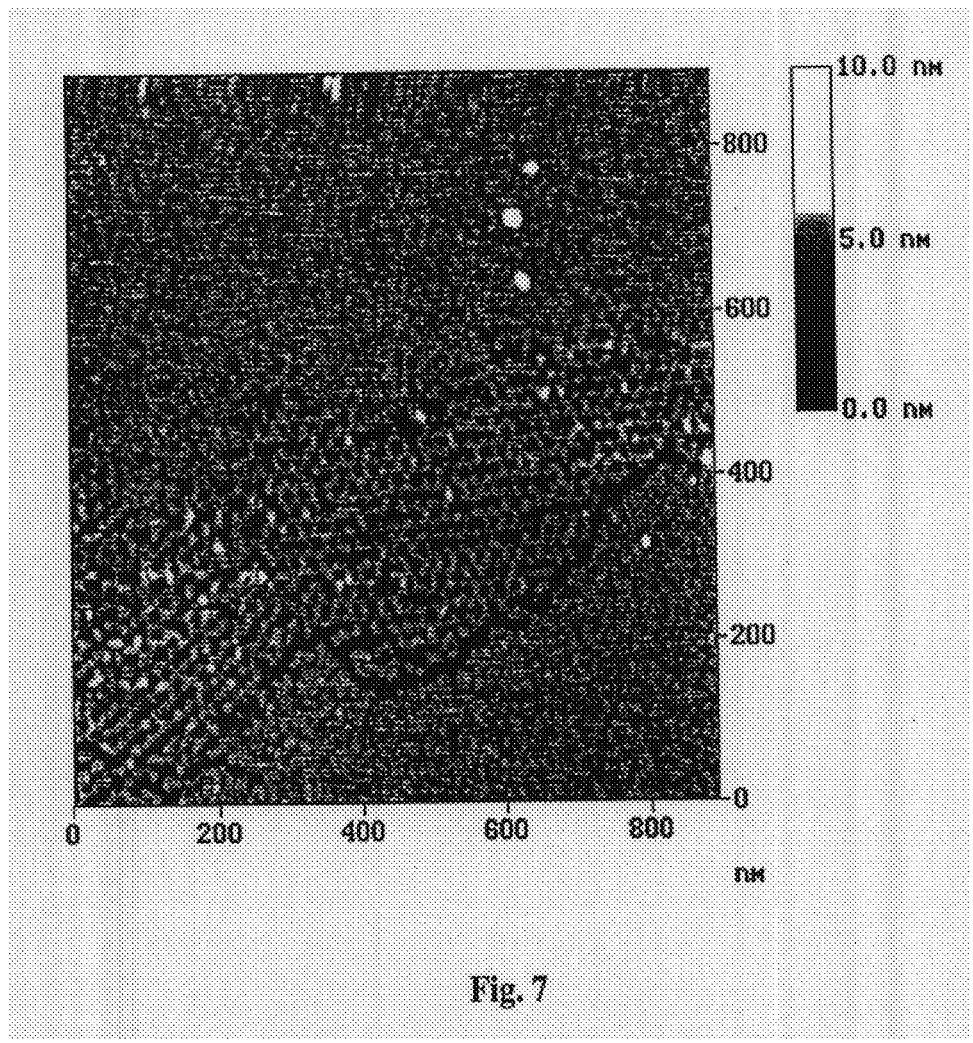
Figure 8:
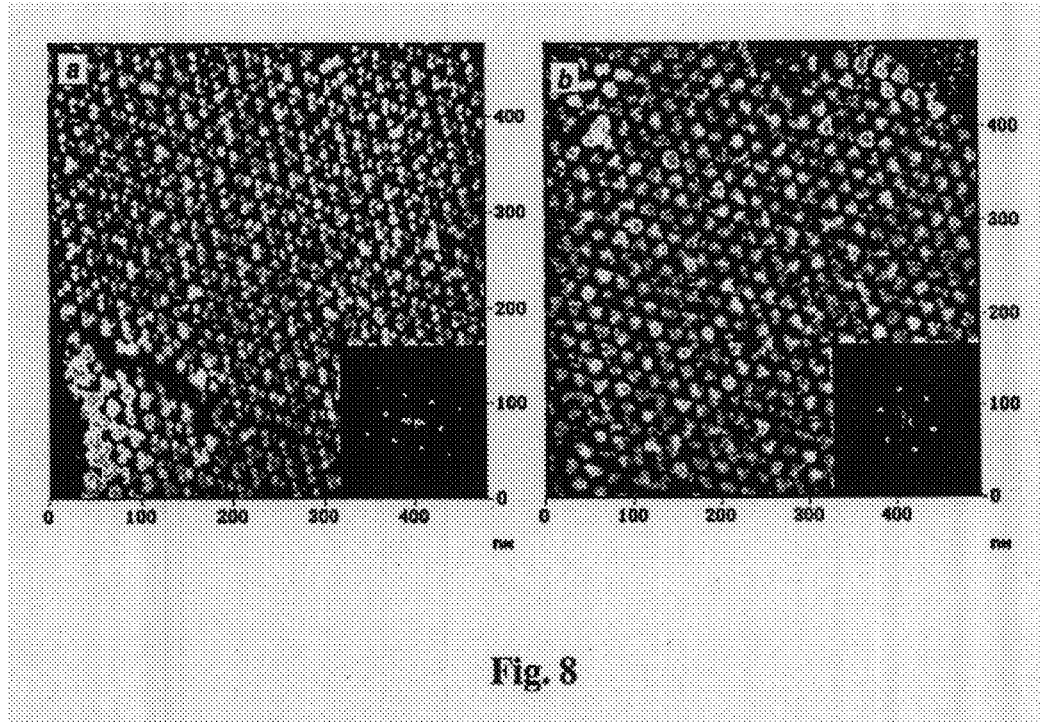
Figure 4:
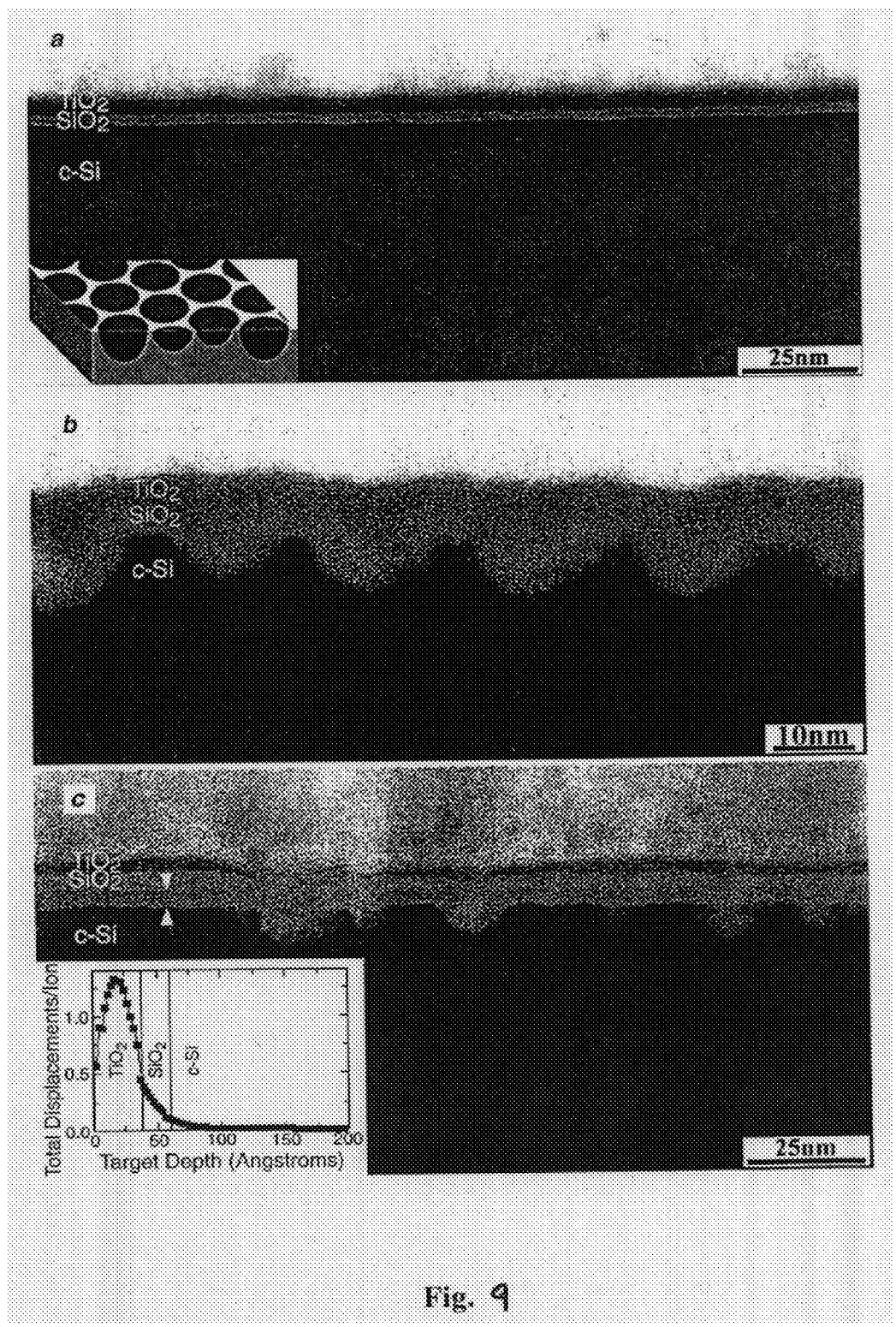
Figure 10:
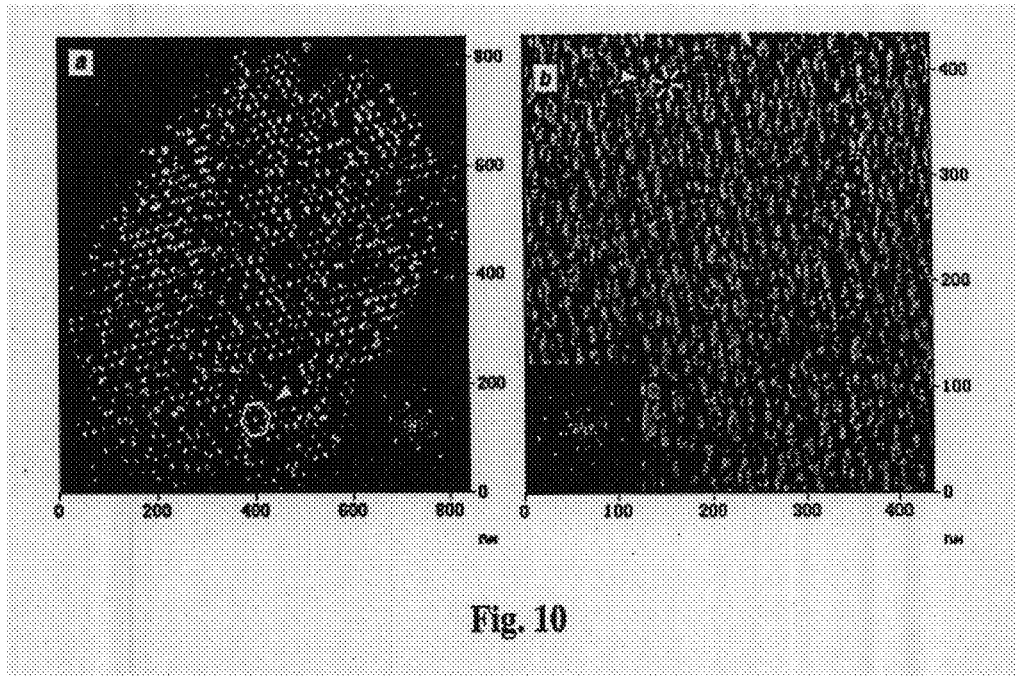
Figure 11:
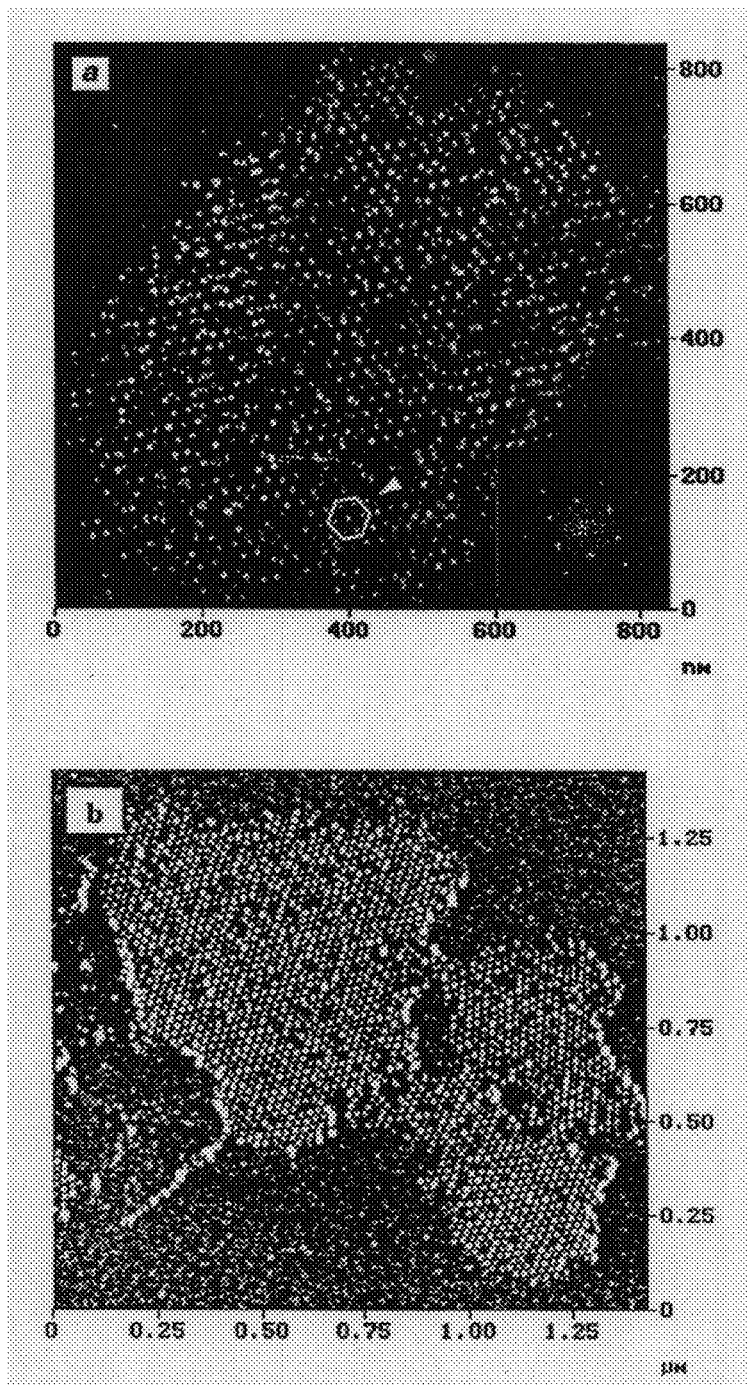
Figure 12:
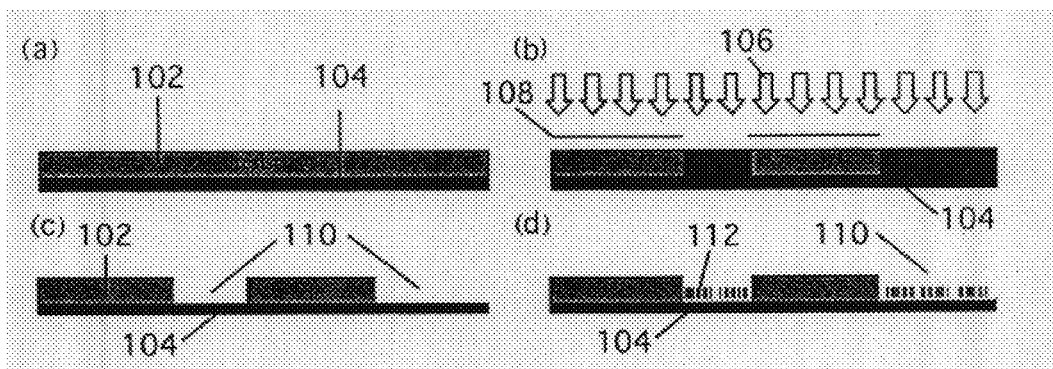
Figure 13:
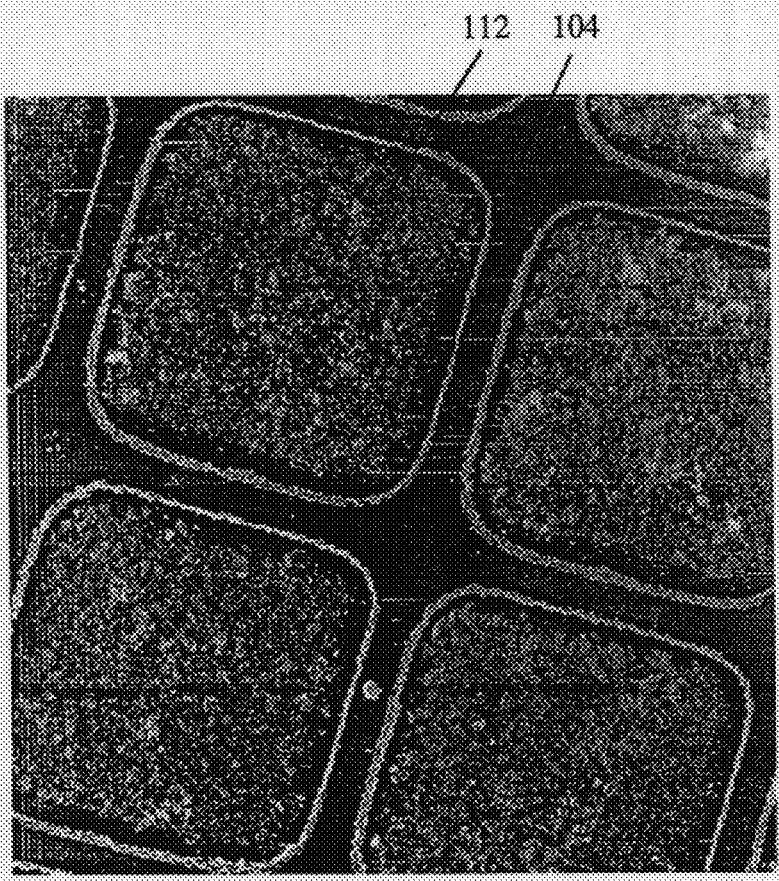

FIG. 13 shows a pattern of S-layers 112 on a substrate 104 that was created as illustrated in FIG. 12 using a 1000-mesh TEM grid as a quick, inexpensive optical lithography mask. The concentration of the adsorbed S-layers may be controlled by controlling the concentration of the S-layers in the aqueous suspension before application.

References

Arkles, Barry, "Silane Coupling Agent Chemistry," in *Silicon Compounds: Register and Review*, 5$^{th}$ Ed., United Chemical Technologies, Inc., Bristol, Pa., pp. 59–64.

Bhatia, S., Teixeira, J., Anderson, M., Shriver-Lake, L., Calvert, J., Georger, J., Hickman, J., Dulcey, C., Schoen, P., and Ligler, F., "Fabrication of Surfaces Resistant to Protein Adsorption and Application to Two-Dimensional Protein Patterning," *Anal. Biochem.* 208, 197 (1993)

Brock, T. D., Brock, K. M., Belly, R. T., and Weiss, R. L., "*Sulfolobus*: A new genus of sulfur-oxidizing bacteria living at low pH and at high temperature," Arch. Mikrobiol. 84, 54 (1972).

Clark et al., U.S. Pat. No. 4,728,591, issued March 1998.

Clark et al., U.S. Pat. No. 4,802,951, issued Feb. 7, 1989.

Deatherage, J. F., Taylor, K. A., Amos, L. A., "Three-dimensional arrangement of the cell wall protein of *Sulfolobus acidocaldarius*," J. Mol. Biol. 167, (1983) 823.

K. Douglas, N. A. Clark, K. J. Rothschild, *Appl. Phys. Lett.* 48 (1986) 676.

K. Douglas, G. Devaud, N. A. Clark, *Science* 257 (1992) 642.

J.-M. Gerard, "Prospects of High-Efficiency Quantum Boxes Obtained by Direct Epitaxial Growth," in *Confined Electrons and Photons*, edited by E. Burstein and C. Weisbuch, Plenum Press, New York, (1995), pp. 357–381.

H. P. Gillis, J. L. Clemons, and J. P. Chamberlain, *Jour. Vac.Sci. Technol.* B10, 2729 (1992).

H. P. Gillis, D. A. Choutov, P. A. Steiner IV, J. D. Piper, J. H. Crouch, P. M. Dove, and K. P. Martin, *Appl. Phys. Lett.* 66 (1995) 2475.

Gillis et al., U.S. Pat. No. 5,917,285, issued Jun. 29, 2999

Grogan, D. W., "Phenotypic Characterization of the Archaebacterial Genus *Sulfolobus*: Comparison of Five Wild-Type Strains," *J. Bacteriol.* 171, (1989) 6710.

M. Grundmann et. al., P. S. Kop'ef. Zh. I. Alfekov, *Phys. Rev. Let.* 74 (1995) 4043.

C. Harrison et al., "Lithography with a mask of block copolymer microstructures,"*Journal of Vacuum Science and Technology* B, 16, (1998) 544.

J. R. Heath et al., *J. Phys. Chem.* 100 (1996) 3144.

J. R. Heath, C. M. Knobler, D. V. Leff, *J. Phys. Chem.* B 1 (1997) 189.

J. C. Hulteen, R. P. Van Duyne, *J. Vac. Sci. Technol* A 13 (1995) 1553.

R. J. Jackman, J. L. Wilbur, G. M. Whitesides, *Science* 269 (1995) 664.

E. Kim, A. Kumar, G. M. Whitesides, *J. Electrochem. Soc.* 142 (1995) 628.

N. Kirstaedter et al., *Appl. Phys. Lett.* 69 (1996) 1226.

Kumar, A., and Whitesides, G., "Features of gold having micrometer to centimeter dimensions can be formed through a combination of stamping with an elastomeric stamp and an alkanethiol "ink" followed by chemical etching," *Appl. Phys. Lett.* 63, 2002 (1993).

Kumar, A., Biebuyck, H., and Whitesides, G., "Patterning Self-Assembled Monolayers: Applications in Materials Science," *Langmuir* 10, 1498 (1994).

Lembcke, G., Durr, R., Hegerl, R., and Baumeister, W., "Image analysis and processing of an imperfect two-dimensional crystal: the surface layer of the archaebacterium *Sulfolobus acidocaldarius* reinvestigated," *J. Microsc.* 161 (1991) 263.

Lercel, M., Craighead, H, Parikh, A., Seshadri, K., and Allara, D., "Sub-10 nm lithography with self-assembled monolayers," *Appl. Phys. Lett.* 68, 1504 (1996).

F. Llewellyn-Jones, *The Glow Discharge*, (John Wiley & Sons, Inc., New York, 1966), p. 66.

W. D. Luedtke, U. Landman, *J. Phys. Chem.* 100 (1996) 13323.

Martin et al., U.S. Pat. No. 5,882,538, issued Mar. 16, 2000.

Martin et al., U.S. Pat. No. 6,027,663, issued Feb. 22, 2000.

Martin et al., U.S. Pat. No. 6,033,587, issued Mar. 7, 2000.

Michel, H., Neugebauer, D.-Ch., Oesterhelt, D., "The 2-D crystalline cell wall of *Sulfolobus acidocaldarius*: structure, solubilization, and reassembly," in Baumeister, W. and Vogell, W. (Eds.), *Electron Microscopy at Molecular Dimensions*, Springer, N.Y. 1980.

J. T. Moore, P. D. Beale, T. A. Winningham, K. Douglas, *Appl. Phys. Lett.* 71 (1997) 1264.

C. B. Murray, D. J. Norris, M. G., Bawendi, *J. Am. Chem. Soc.* 115 (1993) 8706.

C. B. Murray, C. R. Kagan, M. G., Bawendi, *Science* 270 (1995) 1335.

P. Ohara, D. V. Leff, J. R. Heath, W. M. Gelbart, *Phys. Rev. Let.* 75 (1995) 3466.

G. A. Ozin, *Acc. Chem. Res.* 30 (1997) 17.

D. H. Pearson and R. J. Tonucci, "Nanochannel Glass Replica Membranes," *Science*, 270 (1995) 68.

D. Pum, U. B. Sleytr, *Colloids Surf. A: Physicochem. Eng. Aspects* 102 (1995) 99.

Sleytr, U. B. and Messner, P., "Crystalline surface layers on bacteria," *Ann. Rev. Microbiol.* 37 (1983) 311.

Pum, dietmar et al., "Molecular Nanotechnology and Biomimetics with S-Layers," in Uwe B. Sleytr et al., eds., *Crystalline Bacterial Cell Surface Proteins*, Academic Press, 1996, pp. 175–209.

Sleytr, U. B., Sara, M., Pum, D., Küpcü, S., and Messner, P., "Two-dimensional protein crystals (S-layers): Fundamentals and application potential," *Mat. Res. Soc. Proc.* 300 (1994) 193.

St. John, P. and Craighead, H., "Microcontact printing and pattern transfer using trichlorosilanes on oxide substrates," *Appl. Phys. Lett.* 68, 1022 (1996).

Steiner IV, P., "Anisotropic Low-Energy Electron-Enhanced Etching of Semiconductors in DC Plasma," M. S. thesis, Georgia Institute of Technology, Atlanta, Ga., June 1993.

Taylor, K. A., Deatherage, J. F., and Amos, L. A., "Structure of the S-layer of *Sulfolobus acidocaldarius*," Nature 299 (1982) 841.

B. P. Van der Gaag, A. Scherer, *Appl. Phys. Lett.* 56 (1990) 481.

Weiss, R. L., "Subunit cell wall of *Sulfolobus acidocaldarius*," *J. Bacteriol.* 118 (1974) 275.

R. L. Whetten, J. T. Khoury, M. M. Alvarez, S. Murthy, I. Vezmar, Z. L. Wang, P. W. Stephens, C. L. Cleveland, W. D. Luedtke, U. Landman, *Adv. Mater.* 8 (1996) 428 and references therein.

Wilbur, J., Kumar, A., Kim, E., and Whitesides, G., "Microfabrication by Microcontact Printing of Self-Assembled Monolayers," *Adv. Mater.* 6, 600 (1994).

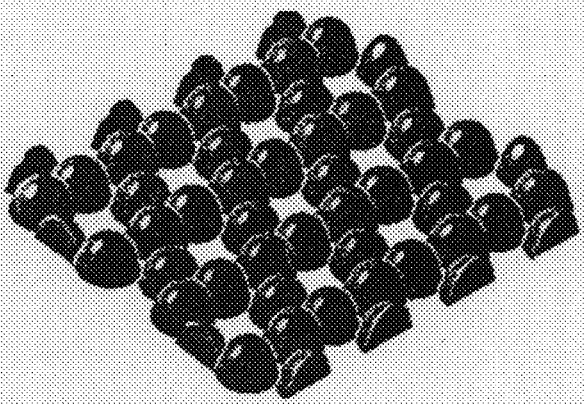

We claim:

1. A substrate including an ordered array of nanoclusters, wherein:

the nanoclusters have a substantially uniform size small enough to allow true quantum confinement behavior;

the nanoclusters occur in a repeating geometric pattern;

the nanoclusters are formed inside regularly arrayed wells in the substrate; and there is substantially no lattice displacement adjacent to the wells.

2. The substrate of claim 1, wherein the nanocluster spacing is between about 3 and about 30 nm.

3. The substrate of claim 1, wherein the nanoclusters have a diameter varying from about 2 to about 10 nm.

4. The substrate of claim 1, wherein:

said substrate includes a plurality of groups of said wells having said nanoclusters formed therein; and wherein said groups are arranged in a predetermined pattern.

5. A substrate including an ordered array of nanoclusters, wherein:

the nanoclusters have a substantially uniform size small enough to allow true quantum confinement behavior;

the nanoclusters occur in a repeating geometric pattern;

the nanoclusters are formed inside regularly arrayed wells in the substrate; and substantially all of the wells each contain a single nanocluster.

6. The substrate of claim 5, wherein:

said substrate includes a plurality of groups of said wells having said nanoclusters formed therein; and wherein said groups are arranged in a predetermined pattern.

7. A substrate including an ordered array of nanoclusters, wherein:

the nanoclusters have a substantially uniform size small enough to allow true quantum confinement behavior;

the nanoclusters occur in a repeating geometric pattern; and the nanoclusters comprise a material selected from titanium, germanium, and silicon.

* * * * *

UNITED STATES PATENT AND TRADEMARK OFFICE
CERTIFICATE OF CORRECTION

PATENT NO. : 6,656,568 B1
DATED : December 2, 2003
INVENTOR(S) : Winningham et al.

It is certified that error appears in the above-identified patent and that said Letters Patent is hereby corrected as shown below:

The Title page showing an illustrative figure should be deleted, and substitute therefore the attached title page consisting of Fig. 1

The drawing sheets consisting of fig.(s) 1, 3, 4, 5, 6, 7, 8, 9 and 10 should be deleted and substitute therefore the attached drawing sheets.

Signed and Sealed this

Seventeenth Day of August, 2004

JON W. DUDAS
*Acting Director of the United States Patent and Trademark Office*

(12) United States Patent
Winningham et al.

(10) Patent No.: US 6,656,568 B1
(45) Date of Patent: Dec. 2, 2003

(54) ORDERED ARRAYS OF NANOCLUSTERS

(75) Inventors: Thomas Andrew Winningham, Broomfield, CO (US); Harry P. Gillis, Los Angeles, CA (US); Kenneth Douglas, Boulder, CO (US)

(73) Assignee: The Regents of the University of Colorado, Boulder, CO (US)

(*) Notice: Subject to any disclaimer, the term of this patent is extended or adjusted under 35 U.S.C. 154(b) by 247 days.

(21) Appl. No.: 09/583,209

(22) Filed: May 30, 2000

Related U.S. Application Data

(60) Provisional application No. 60/136,412, filed on May 28, 1999.

(51) Int. Cl.$^7$ .................................................. G03F 9/00
(52) U.S. Cl. .................. 428/145; 428/141; 428/195; 428/230; 428/332
(58) Field of Search ............................. 428/141, 145, 428/195, 230, 332

(56) References Cited

U.S. PATENT DOCUMENTS

| | | |
|---|---|---|
| 4,728,591 A | 3/1988 | Clark et al. |
| 4,802,951 A | 2/1989 | Clark et al. |
| 5,229,320 A | 7/1993 | Ugajin |
| 5,559,822 A | 9/1996 | Pankove et al. |
| 5,683,595 A | 11/1997 | Nagamachi |
| 5,689,603 A * | 11/1997 | Huth ............................. 385/131 |
| 5,703,896 A | 12/1997 | Pankove et al. |
| 5,747,180 A | 5/1998 | Miller et al. |
| 5,858,457 A | 1/1999 | Brinker et al. |
| 5,882,538 A | 3/1999 | Martin et al. |
| 5,899,734 A | 5/1999 | Lee |
| 5,917,285 A | 6/1999 | Gillis et al. |
| 5,962,863 A * | 10/1999 | Russell et al. ............... 257/14 |
| 6,027,663 A | 2/2000 | Martin et al. |
| 6,033,587 A | 3/2000 | Martin et al. |

OTHER PUBLICATIONS

Arkles, Barry, "Silane Coupling Agent Chemistry," in Silicon Compounds: Register and Review, 5$^{th}$ Ed., United Chemical Technologies, Inc., Bristol, PA, pp. 59–64, No Date.

Baumeister, W. et al., "The Structure of Surface Proteins in Sulfolobus, in *Crystalline Bacterial Cell Surface Layers*," Sleytr, U.B. et al., eds., Springer–Verlag, Berlin, 1988, pp. 75–78, No Month.

Bhatia, Suresh K. et al., "Fabrication of Surfaces Resistant to Protein Adsorption and Application to Two–Dimensional Protein Patterning," *Analytical Biochemistry*, vol. 208, 1993, pp. 197–205, No Month.

Brock, Thomas D. et al., "Sulfolobus: A New Genus of Sulfur–Oxidizing Bacteria Living at Low pH and High Temperature," *Arch. Mikrobiol.* 84, Springer–Verlag, 1972, pp. 54–68, No Month.

Deatherage, J.F. et al., "Three–dimensional Arrangement of the Cell Wall Protein of *Sulfolobus acidocaldarius*," *J. Mol. Biol.*, vol. 167, pp. 823–852, No month.

(List continued on next page.)

*Primary Examiner*—Deborah Jones
*Assistant Examiner*—Stephen Stein
(74) *Attorney, Agent, or Firm*—Marian J. Furst

(57) ABSTRACT

A method of manufacturing an array of nanoclusters and a substrate with an ordered array of nanoclusters. In a preferred embodiment of the invention, nanoclusters may be fabricated by depositing adatoms upon a surface containing an array of etched nanoscale wells, wherein the etched nanoscale wells are produced by etching a surface patterned by a mask containing a regular array of nanoscale pores. More preferably, nanoclusters may be fabricated by depositing adatoms upon a surface containing an array of etched nanoscale wells; wherein, the etched nanoscale wells are produced by low damage etching of a surface patterned by a crystalline mask of biological origin containing a regular array of nanoscale pores. A still further embodiment of the invention is a substrate including an ordered array of nanoclusters.

7 Claims, 10 Drawing Sheets